United States Patent [19]
Lucas et al.

[11] Patent Number: 5,703,938
[45] Date of Patent: Dec. 30, 1997

[54] METHOD OF OPTIMIZING ACCESS TRUNK CONFIGURATIONS AND SYSTEM THEREFOR

[75] Inventors: Gary L. Lucas, Springfield; Kathleen E. Keller, Arlington; David Agatston, Oakton; Drew Caplan, Vienna, all of Va.

[73] Assignee: MCT Communications Corp., Washington, D.C.

[21] Appl. No.: 520,108

[22] Filed: Aug. 28, 1995

[51] Int. Cl.$^6$ .............................. H04N 15/00; H04N 7/00
[52] U.S. Cl. .................. 375/112; 375/132; 375/136; 375/219; 375/220; 379/229
[58] Field of Search .................. 379/111, 112, 379/113, 114, 115, 133, 134, 135, 136, 137, 139, 219, 220, 221, 224, 229, 230, 207, 240; 370/229, 230, 231, 235, 237, 328; 395/200.01, 200.15

[56] References Cited

U.S. PATENT DOCUMENTS

| | | | |
|---|---|---|---|
| 5,136,690 | 8/1992 | Becker et al. | 379/136 |
| 5,270,919 | 12/1993 | Blake et al. | 379/136 |
| 5,546,379 | 8/1996 | Thasweethal et al. | 379/219 |
| 5,572,517 | 11/1996 | Safadi | 370/238 |

*Primary Examiner*—Curtis Kuntz
*Assistant Examiner*—Paul Loomis

[57] ABSTRACT

A network access optimization modeling initiative (NAOMI) that enables the operating personnel of a wide area service provider to configure the trunk connections of a telecommunications access network so as to gain access to the end offices of local area access providers at a given level of performance at minimal cost. Upon request, NAOMI optimizes the direct end office trunk and tandem trunk connections between the serving wire center (SWC) to which a wide area service provider gains access to a local area access provider and the end offices to which long distance calls are directed. In operation, NAOMI first obtains a configuration of the access network so that the respective positions of the points-of-presence (POPs) of the wide area service provider, tandem switches, end offices and various direct end office trunks (DEOTs) and tandem trunks of the access network are known. NAOMI then defines a tandem service area (TSA) to contain at least the POP and the end office through which calls from the wide area service provider are routed. Once the TSA is defined, an optimization process takes place in which the locations of the POP and the end office, the end office's traffic profile and servicing capabilities, the service provider's rates, and the tandem switches are taken into consideration. An optimized trunk configuration is generated at a given grade of service for a minimum cost in response to the optimization process. The optimal trunk configuration is then presented to the operating personnel of the wide area service provider who can follow the recommendations and request the local area access provider to change its trunk configurations for connecting the wide area service provider's POP to its end office.

51 Claims, 16 Drawing Sheets

FIG. 14

NAOMI
Desk Manager: Optimization XXXXX Help

TSA Summary: ABLNTXORG1ST-All-STND  1402a  1402b

| Name | | Modified | Circuit ID | Owner |
|---|---|---|---|---|
| LUB2-1291 | 16:48:05 | 8/24/94 16:48:05 | DT21NCW6 | Tony Anderson |
| LUB2-1299 | 16:48:05 | 8/24/94 16:48:05 | DT21NCW6 | Tony Anderson |
| LUB2-1312 | 16:48:05 | 8/24/94 16:48:05 | DT21NCW6 | Tony Anderson |

DEO1s Subtending LUB2-1291

| Name | | Modified | Circuit ID | Owner |
|---|---|---|---|---|
| LUB2-1212 | 16:49:09 | 8/24/94 16:49:09 | DD21N42X | Tony Anderson |
| LUB2-1254 | 16:49:10 | 8/24/94 16:49:10 | DD21NDN3 | Tony Anderson |
| LUB2-1255 | 16:49:10 | 8/24/94 16:49:10 | DD21NDN2 | Tony Anderson |
| LUB2-1336 | 16:49:10 | 8/24/94 16:49:10 | DD21N42X | Tony Anderson |

| Name | EOOrig | EOOrig800 | EOTBH | EOTerm | Day800 | DayMin |
|---|---|---|---|---|---|---|
| ABLNTXORCG0 | 36 | 390 | 0 | 0 | 3638 | 3873 |
| BARDTXXADS0 | 71 | 1 | 0 | 0 | 435 | 1133 |
| BFLGTXXADS0 | 14 | 13 | 0 | 0 | 273 | 343 |
| BLWLTXXADS0 | 14 | 14 | 0 | 0 | 116 | 275 |
| CLYDTXXADS0 | 151 | 3 | 0 | 0 | 806 | 2100 |

FIG. 17

Input TSA
TSA Name    BELONYFR2OT-BUF-STND    Created Mon 03 Oct 1994 12:01
                                    Updated Thu 06 Oct 1994 09:21

Optimized TSA
TSA Name    BELONYFR2OT-BUF-STND-DPT    Created Mon 03 Oct 1994 12:01
                                       Updated Thu 06 Oct 1994 09:21

Optimization Values
Tandem       Recoup Days       Initiation
7500         90                Mike P. Harris      AWO Create   No
Remarks  End Office BFLONYFR1CD does not have Access Trunk — only
         Terminating Trunks considered Recommendation
         Daily Cost          Recoup Days         NRC            Total
Start    3406.99        ×    90            +     0         =    306629.10
Opt      2754.27        ×    90            +     8119.00   =    250003.30

Make Recommended

1702 — Input TSA
1704 — Optimized TSA
1706 — 90
1708 — Remarks
1710 — Recommendation

FIG. 18

Optimized TSA Tandem Trunk Changes

| Name          | Dir | OrigCkts | OptCkts | Diff | OrigUtil | OptUtil |
|---------------|-----|----------|---------|------|----------|---------|
| BRK1-1294-OPT | b   | 72       | 96      | 24   | 77.00 %  | 56      |

1806  1804  1808  1810  1802  1812

Profile [ABLNTXORCGO]

Print....  Multiply.....

Identification
Name [           ]   Owner  Carl Daniels

Status
Created  Wed 07 Sep 1994  10:19   Updated  Wed 07 Sep 1994  10:19

TUI Group  [      ]▼

|        | 0700 | 0800 | 0900 | 1000 | 1100 | 1200 | Totals | BH   |
|--------|------|------|------|------|------|------|--------|------|
| Term.  | 0    | 0    | 0    | 0    | 0    | 0    | 0      | 0000 |
| Orig.  | 0    | 3    | 22   | 2    | 0    | 1    | 102    | 0900 |
| 800    | 0    | 0    | 0    | 0    | 0    | 0    | 0      | 0000 |
| Totals | 0    | 3    | 22   | 2    | 0    | 1    |        |      |

Note : Traffic appears in CCS

[Save]   [Reset]   [Cancel]   [Help]

Provider [SWEB]

Identification  — 2002
Name  SOUTHWESTERN BELL
Code  SWEB           Owner

Status
Created        Updated        2010   2006

Non-Recurring Costs — 2004
DS1 Connect Costs  $ 456.00      DS3 Connect Costs  $ 496.00
DS1 Disconnect Costs  $ 0.00     DS3 Disconnect Costs  $ 0.00    — 2008

Channel Term  $ 1,696.04   Mux $ 815.00   CCS7 STP code  ??

Banded Mileage
x xx xxxx xx   xxxxxx xx   xxxx   xxxxx xxxx xxx xxxxx xxxx

FIG. 20

METHOD OF OPTIMIZING ACCESS TRUNK CONFIGURATIONS AND SYSTEM THEREFOR

FIELD OF THE INVENTION

The present invention relates to the accessing by a long distance carrier of the end offices of a local area service provider or competitive access provider in a telecommunications network and more specifically to the optimizing of direct and tandem trunk configurations of the access network at a minimal access cost.

BACKGROUND OF THE INVENTION

In a telecommunications network, a wide area service provider, for example a long distance carrier, needs to interface with a local exchange carrier (LEC), for example a local access service provider, so that call such as, for example, a long distance call can be routed to an end office of the local access service provider. The interfacing or gaining of access between a wide area service provider and a local area service provider is shown in FIG. 1. As illustrated, a point-of-presence (POP) 2, which belongs to the wide area service provider, is connected to a serving wire center (SWC) 4, which belongs to the local access service provider or a competitive access provider (CAP). SWC 4 contains the requisite equipment for interfacing with POP 2.

To provide service to the end user, for example the telephone customer, a number of end offices (EOs) such as 6 and 8 are shown to be connected to SWC 4 by direct end office trunks (DEOTs) 10a, 10b, 12a and 12b. DEOTs 10a and 12a are conventionally referred to as terminating trunks while DEOTs 10b and 12b are conventionally referred to as originating trunks.

Further connected to each of the end offices 6 and 8 by tandem trunks 10c, 10d, 12c and 12d is a tandem switch 14. Tandem switch 14 in turn is connected to SWC 4 by tandem trunks 16a and 16b. Similar to the designations for DEOTs, tandem trunks 10c and 12c may be referred to as terminating tandem trunks while tandem trunks 10d and 12d may be referred to as originating trunks. Collectively, trunks 10c, 10d, 12c, 12d, 16a and 16b are referred to as tandem trunks.

In operation, the communications traffic traversing between the wide area network and the end offices of the local area network ordinarily traverse through the DEOTs and end offices 6 and 8. However, if all of the circuits in the DEOTs are busy, the traffic overflow is routed to the tandem trunks. A configuration such as that shown in FIG. 1 is conventionally referred to as a tandem service area (TSA).

Prior to Jan. 1, 1994, all call traffic traversing from a long distance carrier to a local exchange area was charged on a equal cost per minute basis, with the only modification being that the so-called airline miles between the end office and the serving wire center be taken into account. Thus, the cost that was charged to a long distance carrier was substantially independent of how the traffic had moved through the network. Accordingly, the only major thing that a long distance carrier needed to worry about in terms of moving its traffic was the grade of service it wanted to obtain. In other words, a long distance carrier paid scant attention to how calls were carried by local access providers so long as the calls reached the end users.

All of that changed when the Federal Communications Commission (FCC) decided that after Jan. 1, 1994, the access charges should more closely reflect the true cost per access rather than the previous arbitrary costs and tariff. To introduce this restructing of the cost, the FCC introduced the concept of local transport restructuring (LTR). In essence, LTR separates the access costs into three different components. The first component is the cost charged by an access provider for a long distance carrier to use its facilities connecting the POP 2 to the SWC 4 shown in FIG. 1. This first component may be referred to as an entrance facility cost which is a fixed cost based on a per circuit basis. The second component is also a fixed per mile cost that a long distance carrier incurs when it leases direct trunks, for example the DEOT connecting an end office to a SWC, from the local access provider. In other words, a long distance carrier is not charged on a per call basis over the DEOTs that it leases from the local service provider, irrespective of how many calls are placed over the DEOTs. The third component is based on the overflow of traffic to the tandem trunks. Just as it was before LTR, traffic overflowed to the tandems are charged on a cost per minute basis.

In view of the changes to the cost structure, from the perspective of a long distance carrier or a wide area service provider, a cost problem exists. This cost problem is essentially a capacity problem in that the long distance service provider has to determine how many DEOTs and tandem trunks it should lease from a local area access provider in order to achieve a specific grade of service at a minimum cost. Putting it simply, the long distance carrier has to balance what it considers to be acceptable call blocking against the access costs it incurs. Given the fact that a long distance carrier pays approximately half of its revenue as access costs to local area service providers, the ability for a long distance carrier to optimize its access trunk configurations so as to minimize its access costs is therefore of utmost import.

SUMMARY OF THE INVENTION

The present invention network access optimization modeling initiative (NAOMI) minimizes access costs by optimizing the trunk configuration of the access network and provides recommendations for changes that result in lower access costs. In particular, an overall configuration of the access network or telecommunications network is stored in a database so that the respective locations of the points-of-presence (POPs) of the wide area service providers, the tandem switches and the end offices of the various access providers are known. With the sites of the different POPs, tandem switches (tandems) and end offices known, the relative distances between the various POPs and end offices can be calculated.

The various trunks that are adaptable to carry traffic between the various POPs and end offices are also stored in the database. In addition, the directions which traffic may traverse on the respective trunks are stored so that the NAOMI system knows whether a given trunk is for originating traffic, terminating traffic or is capable of carrying bidirectional traffic. Whether a trunk is a direct end office trunk (DEOT) or a tandem trunk is also stored as data in the database. Some end offices are not DEOT capable since they do not have the necessary equipment. Other access capabilities of the end offices are also stored.

Information further available to the present invention NAOMI system is the particular access provider to which an end office belongs. There are a plurality of access providers each of which may control a number of end offices. These access providers may be LECs, regional Bell companies (RBOCs) or telcos, or competitive access providers (CAPs).

In addition to the overall telecommunications network configuration, the cost information relating to the various access providers and their respective end offices is also stored. This cost information includes the various costs that a wide area service provider needs to pay to a local access provider in order to access its end offices. As was mentioned before, these costs include the entrance facility cost, the fixed cost relating to the leasing or purchasing of the various trunks and the varied cost of overflow traffic to tandems.

The NAOMI system defines a tandem service area (TSA) to encompass the POP that is being used by the long distance carrier to access the end office to which a long distance call is to be directed. A TSA is defined to include at least the POP and end office of interest and any tandem that the end office subtends to. If the tandem happens to also subtend to other end offices, those other end offices are also included in the TSA. Tandems that are connected to those other end offices are also included in the same TSA. Thus, additional end offices and tandems are added to the configuration of a TSA until there no longer is any subtending tandems or end offices.

The traffic profile or traffic pattern of each of the end offices in the TSA are recorded for a predetermined period of time, for example a 24 hour time period. The traffic profile is broken down on a given time period basis, for example hourly, so that the NAOMI system knows how much of the traffic is originating, terminating, 800 or some other special service. Depending on the capabilities of each individual end office, overflow traffic is routed accordingly.

After the particular TSA has been defined, the NAOMI system utilizes the data that was stored in its database relating to the distances between the various POPs and end offices, the access capabilities of the end office(s) of interest, the cost data relating to the access provider to which the of interest end office(s) belongs and the traffic pattern relating to the of interest end office(s) to configure DEOT and tandem trunk connections between the POP of the long distance carrier and the end office(s) of interest to obtain an optimized configuration for that TSA at a minimal access cost.

To ensure that the telecommunications network is optimally configured, since a long distance carrier or wide area service provider in actuality accesses various local area access providers and some competitive access providers, the various POPs belonging to the wide area service provider may be configured with the various end offices belonging to the various local area access providers to define a plurality of tandem service areas. Thus, the telecommunications network may be considered to comprise a number of TSAs. To obtain a minimum access cost for all subscribers of the wide area service provider, all of the defined TSAs may be configured to have optimized direct and tandem trunk configurations for a given grade of service at a minimum cost.

It is therefore an objective of the present invention to provide an optimized trunk configuration for an access network that results in lowered access costs for a wide area service provider.

It is another objective of the present invention to provide recommendations for trunk configuration changes to operating personnel, i.e. traffic engineers and managers, of a wide area service provider so that the operating personnel lease or purchase only the minimum number of trunks from the various local access service providers for a particular grade of service.

BRIEF DESCRIPTION OF THE DRAWINGS

The above mentioned objectives and advantages of the present invention will become apparent and the invention itself will be best understood by reference to the following description of an embodiment of the invention taken in conjunction with the accompanying drawings, wherein:

FIG. 14 is a display output of a summary of an exemplar TSA that shows the different trunks and end offices in an exemplar TSA;

FIG. 17 is an exemplar graphical display representative of the optimization summary that shows the cost savings due to trunks having been resized as recommended by the NAOMI system;

FIG. 18 is an exemplar display that shows the result from an optimization that recommends increasing the number of circuits of a tandem trunk;

FIG. 19 is an exemplar display of a 24 hour traffic profile for an end office; and FIG. 20 is an exemplar display of the cost data of an access provider.

DESCRIPTION OF THE PREFERRED EMBODIMENTS

Figure 2:
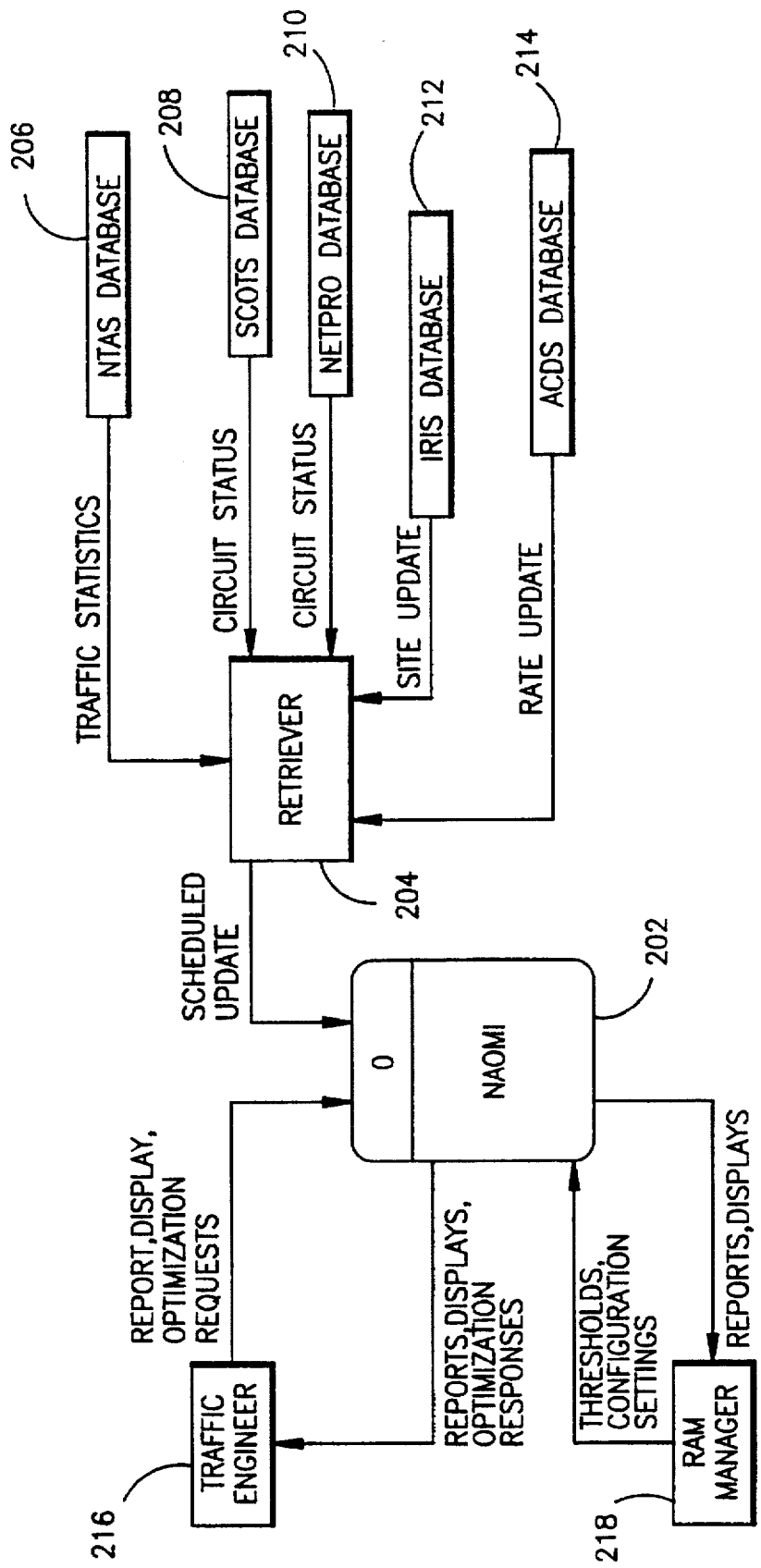
FIG. 2 is an overall view of the interrelationships between the instant invention NAOMI system, its databases and its operating personnel.

With reference to FIG. 2, the interrelationship between the present invention network access optimization modeling initiative (NAOMI) system and its external environment is shown. Specifically, the NAOMI system, designated 202, has connected thereto a retriever system 204, which in turn is communicatively connected to a number of databases. The first of these databases is a national traffic analysis system (NTAS) database 206 which provides traffic statistics to NAOMI system 202. The traffic statistics provided by NTAS database 206 includes call detail records that are generated each time a call is placed to the wide area service provider or long distance carrier of the NAOMI system. The primary use of these call detail records is for billing purposes. At a predetermined time interval, for example every Monday morning, all of the traffic statistics captured from the call detail records of calls placed through the wide area service provider for the previous week are accumulated and stored in the NTAS database 206 so that the wide area service provider knows the amount of traffic that is being carried in each of its switches across its trunks. Given that information, the wide area service provider is able to determine the profile or pattern of traffic of each end office to which calls are directed. Thus, the traffic statistics is one component that allows the wide area service provider to determine the configuration of the telecommunications network.

A second database that is connected to retriever system 204 is the switched circuit order tracking system (SCOTS) database 208. It is into this database that information relating to an access work order from operating personnel of the wide area service provider are input, for ordering the kinds of trunks from the local exchange carriers (LECs) or regional Bell operating companies (RBOCs). By retrieving the status of the circuits from SCOTS database 208, NAOMI system 202 is able to determine the configuration of the network for its optimization process, discussed later.

A third database that is connected to retriever system 204 is a network provisioning (NETPRO) database 210. Similar to the SCOTS database 208, NETPRO database 210 is also used by the wide area service provider to obtain the status of the circuits of the network so that it can determine the resources that it has and the information that it needs for sizing the circuits of the trunks and the point-of-presence (POP) it will use for routing a call to a local area service provider.

A fourth database that is connected to retriever system 204 is an integrated reference information system (IRIS) database 212 which is used to store information concerning each site in the access network. Data stored in IRIS database 212 includes the locations of the POPs to enable determination of the distance between each POP and a particular end office. In addition, data relating to whether each end office is adaptable to have connected thereto a direct trunk is stored in IRIS database 212. Other information stored in IRIS database 212 includes whether or not an end office is adaptable to carry 800 service. The information stored in IRIS database 212 is updated and can be input directly into NAOMI system 202.

The last database connected to retriever system 204 is an access cost determination system (ACDS) database 214. Similar to IRIS database 212, the information stored in ACDS database 214 can be directly input to NAOMI system 202. ACDS database 214 contains the rates, tariffs or costs, that are charged to the wide area service provider when it accesses the trunks and end offices of a local area service provider or competitive access provider. This is important insofar as different local area service providers have different tariffs, and accordingly different trunk configurations are charged differently.

NAOMI system 202 is also shown to be connected to operating personnel of the wide area service provider, as for instance exemplified by traffic engineer 216 and regional access management (RAM) manager 218. As will be made clear infra, a traffic engineer may request that NAOMI system 202 performs an optimization of the configuration of the trunk connections between a POP and an end office. Once done, the optimization response is provided by NAOMI system 202 to the traffic engineer who then can place an order to the LEC(s) for either leasing or purchasing additional trunks, or disconnecting already connected trunks. RAM manager 218, on the other hand, provides particular threshold and configuration settings such as for example an acceptable usage percentage of call blocking to NAOMI system 202 for its optimization process. The threshold and configuration settings are used by NAOMI system 202 in its optimization configuration processes. Displays and reports are produced by NAOMI system 202 to RAM manager 218 as a feedback.

Although not shown, both traffic engineer 216 and RAM manager 218 interface with NAOMI system 202 by terminals which may be connected to a local area network (LAN). Input and output data are presented to the traffic engineer and RAM manager on a terminal display or as printed copies.

NAOMI system 202 comprises a processor which may be a minicomputer such as for example the VAX line manufactured by Digital Equipment (DEC), or a personal computer using microprocessors manufactured by the Intel Company. Alternatively, the NAOMI system may comprise a work station such as for example any one of those made by the Sun Company, Hewlett-Packard etc. Retriever system 204 in turn comprises a processing unit which may either be a stand-alone computer unit or may in practice be incorporated into NAOMI system 202.

Figure 3:
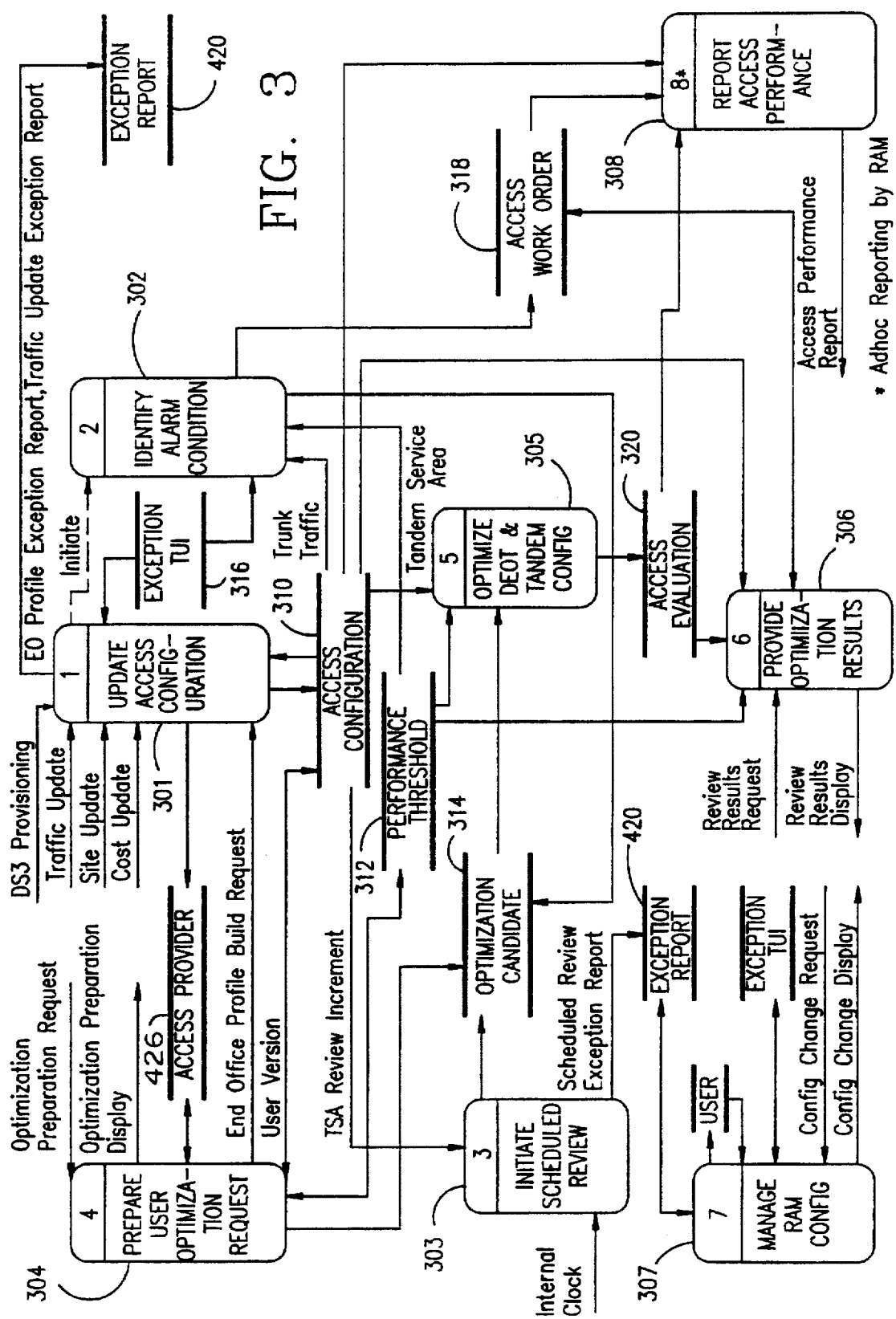
FIG. 3 is a diagram illustrating the different application processes performed by the NAOMI system of the instant invention.

The different functional processes performed by NAOMI system 202 are illustrated in FIG. 3. As shown, the operating personnel of the wide area service provider may output an optimization preparation request to the NAOMI system which is fed to application process 304. In response to the request, needed data is retrieved from the different databases shown in FIG. 2 and results of the request are displayed to the operating personnel such as for example the traffic engineer and/or RAM manager of the network.

As specifically shown in FIG. 3, there are eight different application processes performed by the NAOMI system to fulfill an optimization request. Information required by the different processes is retrieved from databases that are part of the NAOMI system. The eight application processes or modules are: an update access configuration process 301, an identify alarm condition process 302, an initiate scheduled review process 303, the already mentioned prepare user optimization request process 304, an optimized DEOT and tandem configuration process 305, a provide optimization results process 306, a manage RAM configuration process 307 and a report access performance process 308.

Figure 4:
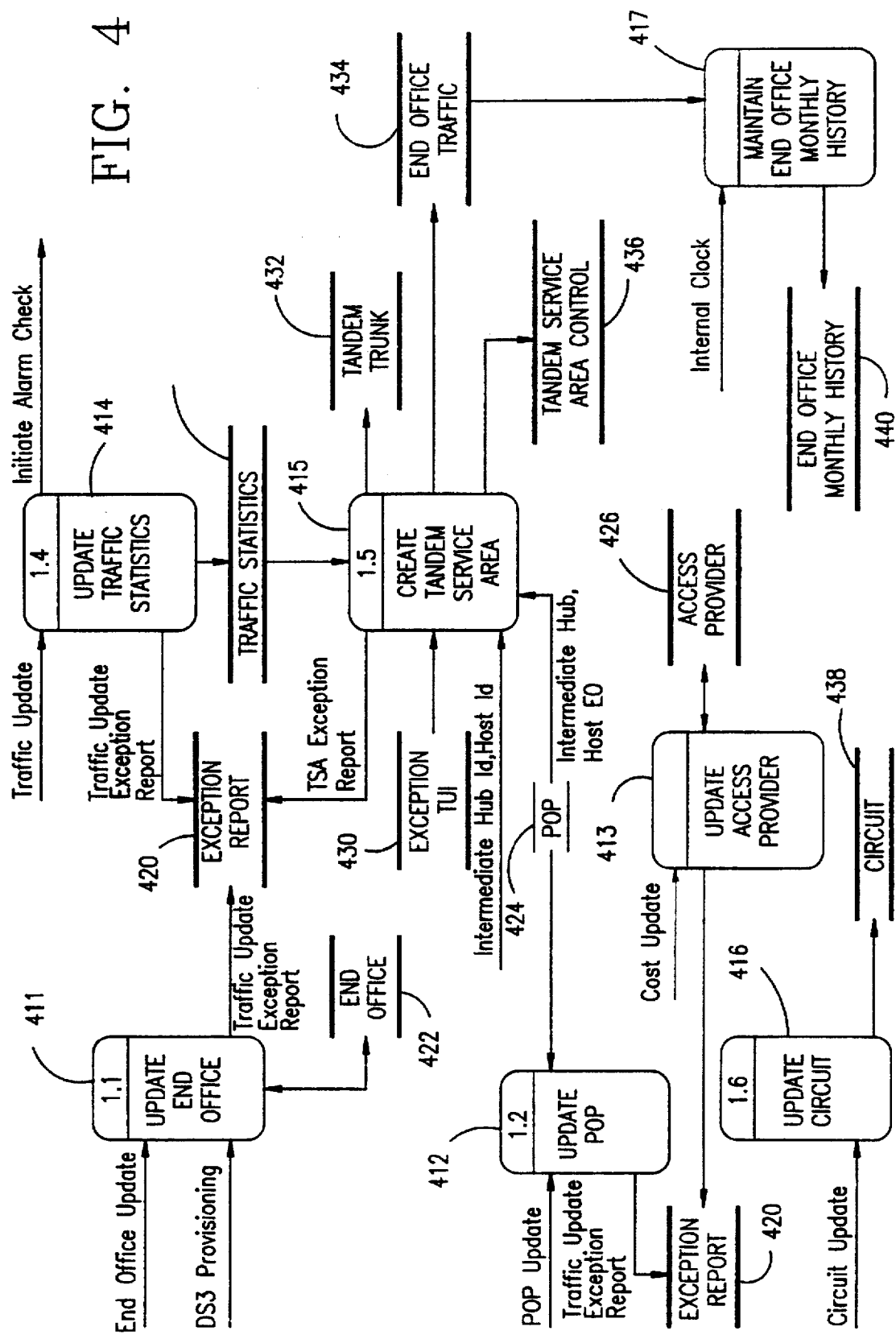
FIG. 4 is a diagram focusing onto the update access configuration process illustrated in FIG. 3.

With reference to update access configuration application process 301, it can be seen that a number of inputs are provided to this process. Some of these inputs include data from the external databases shown in FIG. 2. For example, cost update data, site update data and traffic update data are provided to application process 301 as inputs. In addition, the status of the circuits, in terms of the sizing of the circuits such as digital signal level 3 (DS3) data, is also provided to update access configuration application process 301. Additional access configuration information, such as the end office and POP traffic information from IRIS database 212 retrieved and stored in an access configuration database 310 in the NAOMI system, is input to application process 301. Similarly, information relating to the access rates for each access provider is retrieved from ACDS database 214 and stored in access configuration database 310. Traffic information relating to the trunks, end offices defined by a particular TSA, for example the FIG. 1 TSA, is also stored. For historical reporting purposes, the average and high usage rates for each end office in a TSA are calculated and stored, for example, on a monthly basis. Application process 301, as shown in FIG. 3, provides an output to an access provider store 426, and another output to an exception report store 420. There are a number of subprocesses performed under update access configuration application process 301 for obtaining information from the different databases and organizing the retrieved data in a particular way so that it may be used by the NAOMI system. These subprocesses are shown in FIG. 4.

The first subprocess of the update access configuration application process 301 is an update end office subprocess 411. As shown, end office update data, retrieved from IRIS database 212 and stored in access configuration store 310, is input as an access capability of the end office to subprocess 411. Another piece of information relating to the access capability of the end office is the size of the trunks, as represented by DS3 provisioning data retrieved from NET-PRO database 210, which is also input to update end office subprocess 411. The creation of a new end office or the deletion of an old end office is reported as an exception report to an exception report store 420. Information relating to the end office is stored in an end office store 422.

Figure 13:
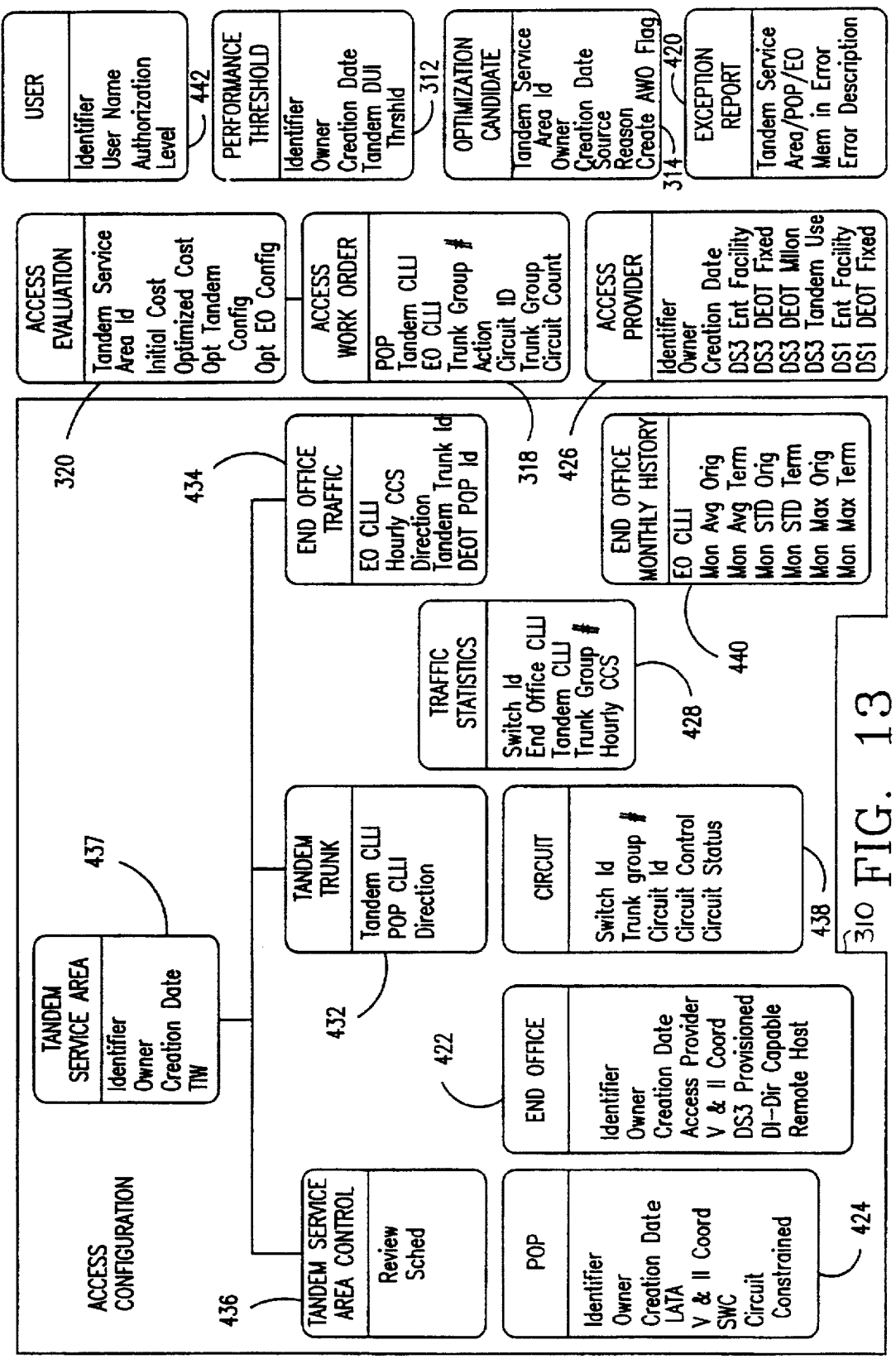
FIG. 13 shows the various data stores of the instant invention NAOMI system.

End office store 422 is also shown in FIG. 13 to include information relating to the identifier of the end office, the local area service provider or access provider who own the particular end office, the creation date of the information relating to that end office, the end office's common local language identifier (CLLI) code, its vertical and horizontal (V&H) coordinates in the network, the end office's capability for DEOT access, bidirectional access and direct access such as for example by DS3 trunks, and the end office's host.

As noted above, upon receipt of end office update information for a new end office, update end office subprocess 411 creates an update for the end office and reports such as a traffic update exception report to exception report store 420. If information relating to updating an end office for an existing end office is received, subprocess 411 replaces the current end office information with the updated end office information. Once a particular setting, such as for example DS3 setting has been assigned to an end office by an operating personnel such as the RAM manager, the same setting is assigned to the new end office with the same end office CLLI code. If the end office update is not received for an existing end office within a given period of time, the end office is deleted and such deletion is reported on the traffic update exception report to exception report store 420. Any changes in the network provisioning status is also reported as an exception to exception report store 420.

Each POP configured to be part of the telecommunications network is updated by update POP subprocess 412. The updated information of each POP, retrieved from IRIS database 212 and stored in access configuration store 310, is fed to update POP subprocess 412. Additional information relating to each POP is fed to subprocess 412 from POP store 424. As shown in FIG. 13, POP store 424 contains the following information for each POP: an identifier for that POP; the owner or the operating personnel of that POP; the creation date of the current data for the POP; the access provider or the local access transport area (LATA) in which the POP is located, the vertical and horizontal (V&H) coordinates where the POP is located, the serving wire center (SWC) by which the POP accesses the LATA, and circuit constraints, if any, that that POP has. Circuit constraints may include for example whether a POP is adaptable for access, terminating or bidirectional traffic.

Update POP subprocess 412 receives periodically, for example on a weekly basis, update POP information. Upon receipt of the POP update information, if it is for a new POP, a new POP is created and such creation is reported on a traffic updated exception report, which is forwarded to exception report store 420. If the updated information received is for an existing POP, the current POP information relating to that POP is replaced by the updated information. If a POP update information is not received for an existing POP within a given period of time, then that existing POP is deleted and such deletion is reported on the traffic update exception report to exception report store 420. Once the circuit constraint setting has been specified for a POP by the operating personnel, the same setting is used for any new POP with the same POP identifier.

A third subprocess for updating the access configuration is the update access provider subprocess 413. Here rate information for each access provider is retrieved from ACDS database 214 and stored in access configuration store 310 within NAOMI system 202. The creation of a new access provider or the deletion of an old access provider is reported on the traffic exception report and forwarded to exception report store 420. Similar to the other subprocesses of application process 301, a periodic update, for example a weekly update, is provided to update access provider subprocess 413. Upon receipt of the update information, if a new access provider is requested, update access provider subprocess 413 creates the new access provider and reports such addition on its traffic update exception report. If the information received is for updating an existing access provider, the current access provider information for that access provider is replaced with the updated information. If no updated information is received for an existing access provider, that access provider is deleted and the deletion is reported on the traffic update exception report. Data relating to the various access providers are stored in an access provider store 426.

The particular data stored in access provider store 426 for each access provider is shown in FIG. 13. For example, each access provider is provided with an identifier so that it can be identified. The operating personnel responsible for the configuration of the access provider, for example Bell Atlantic or Ameritech, is also provided as an entry in access provider store 426. In addition, the creation date of the last available information is also stored. The different costs for a wide area service provider to gain access to the particular access provider are given as an entrance facility cost, a DEOT fixed cost, a DEOT miles cost and a tandem use cost. Note that the costs for different entrance facilities vary, depending on whether a facility is DS1 or DS3 adaptable. Similarly, the cost for different types of fixed direction connections also varies. As was mentioned previously, the different costs or tariffs for different access providers may be different.

The next subprocess performed by update access configuration application process 301 is update traffic statistics subprocess 414. As an input, subprocess 414 receives traffic update information from NTAS database 206. Upon receipt of the traffic update information which may be on a periodic basis such as for example weekly, update traffic statistics subprocess 414 creates current traffic statistics for each trunk and end office of the network and forwards that updated information to a traffic statistics store 428, which is also shown in FIG. 13. Upon receipt of the periodic trunk traffic statistics, update traffic statistics subprocess 414 creates a new trunk identified with a date stamp for that weekly update. When it receives the periodic end office traffic statistics, update traffic statistics subprocess 414 creates a new end office statistics and identifies it with a date stamp.

Upon completion of a periodic traffic statistics update, update traffic statistics subprocess 414 initiates an alarm check, which will be discussed later. In addition, when it completes its periodic traffic statistics update, update traffic statistics subprocess 414 initiates the creation of a TSA, as indicated by the output from traffic statistics store 428 to the create tandem service area subprocess 415, to be discussed infra. In addition, update traffic statistics subprocess 414 deletes the periodic trunk traffic statistics and end office traffic statistics after a given period of time, for example four weeks. The traffic statistics stored in traffic statistics store 428 includes the tandem switch ID, the end office CLLI, the tandem trunk CLLI, the trunk group number and the hourly CCS, which is the time period used in network optimization which equals to 100 call seconds.

Figure 1:
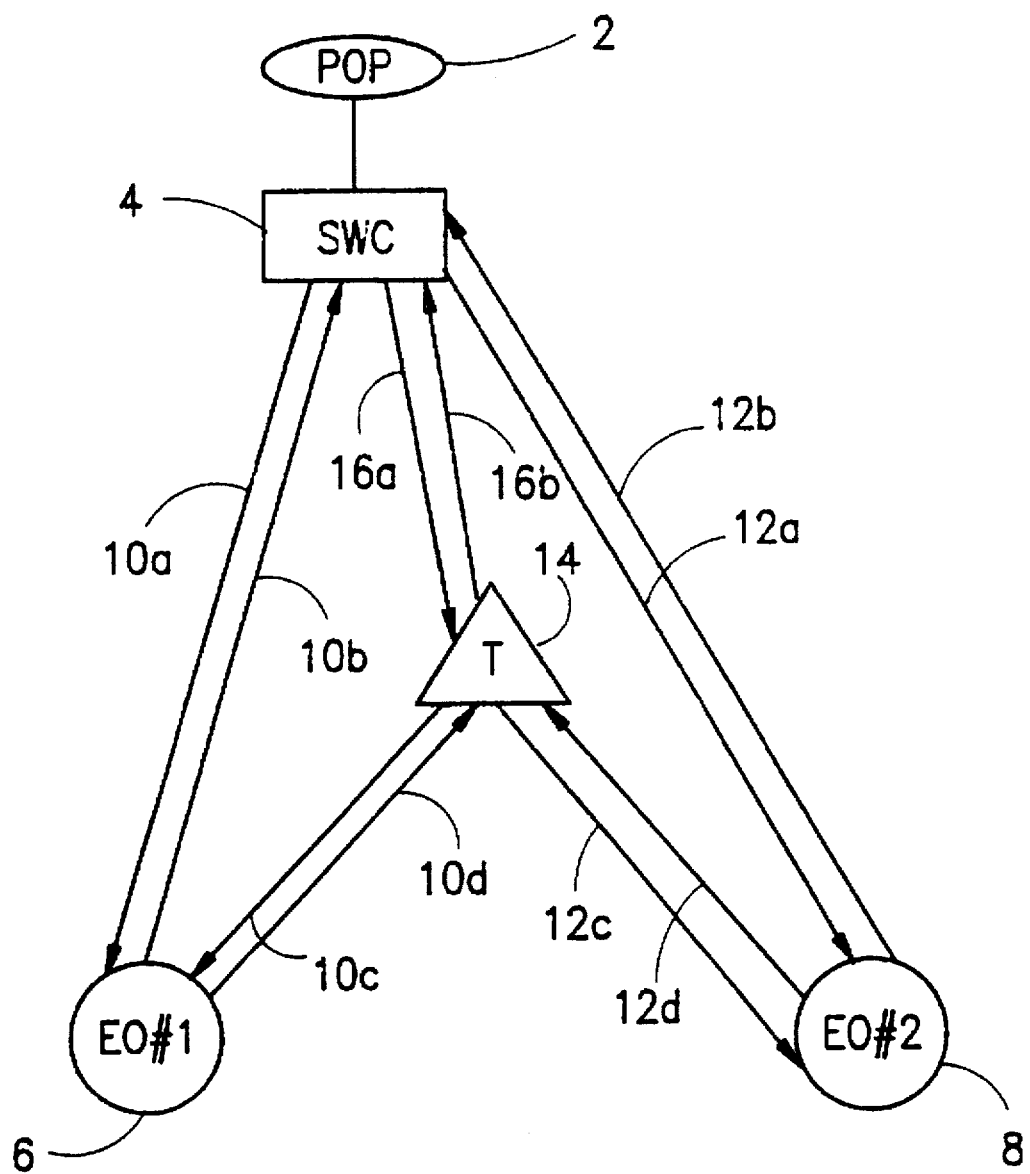
FIG. 1 is an illustration of a tandem service area used for explaining the background of the invention and the defining of a TSA by the present invention NAOMI system.

The next subprocess of the update access configuration application process 301 is the create tandem service area subprocess 415. Before discussing the particulars of subprocess 415, note that a TSA, as discussed with reference to FIG. 1, is defined by a set of tandem trunks and office(s) whose traffic subtends those tandem trunks. The present invention NAOMI system optimizes the number of tandem trunks and the direct end office trunk (DEOTs) connections for the TSA.

Figure 9:
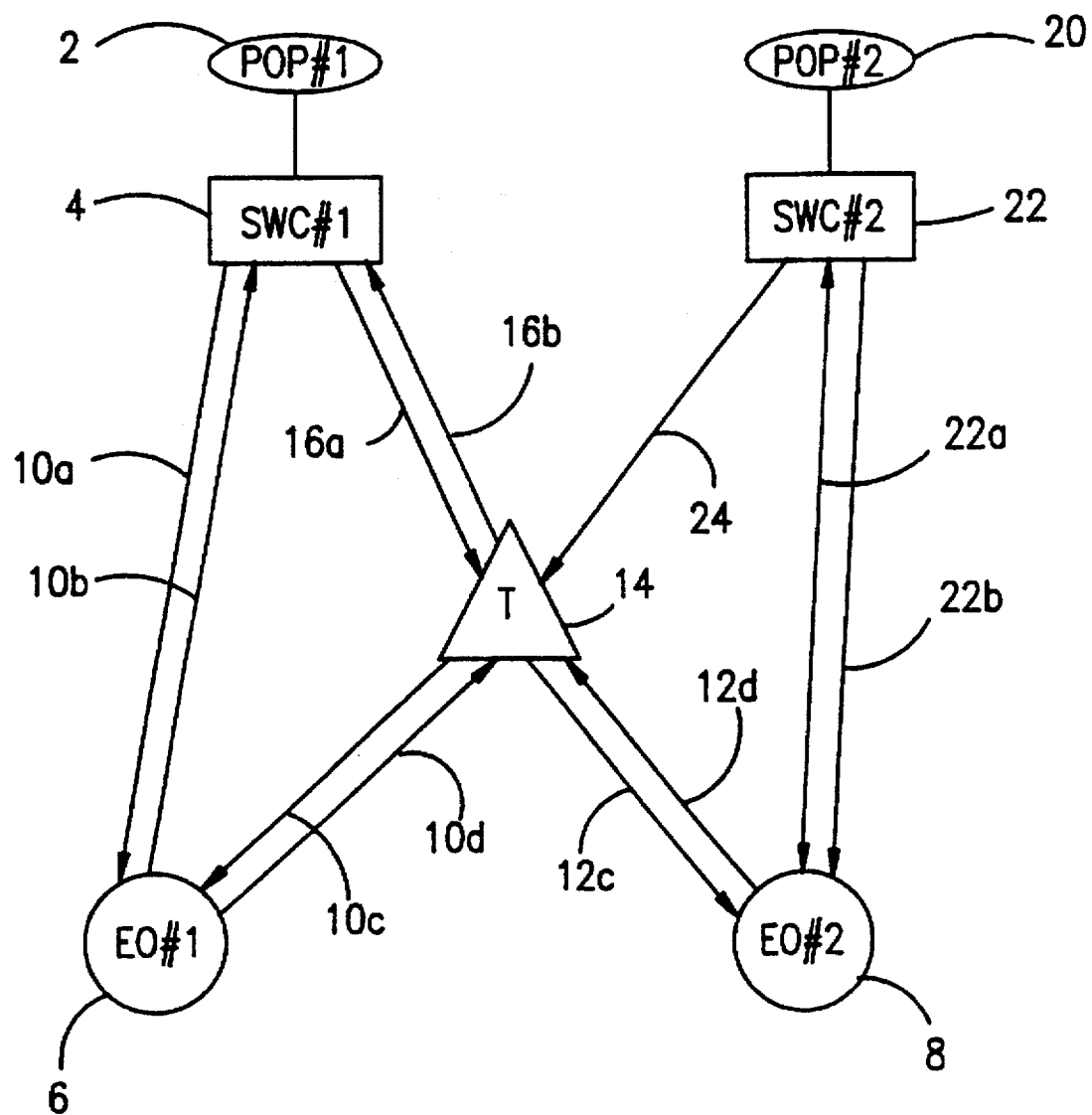
FIGS. 9–11 are illustrations of different TSAs.

As shown in FIG. 1, normally a TSA has only one POP, one tandem switch and one end office. However, in the overlap configuration of FIG. 9 for which the same components as FIG. 1 are labeled the same, a TSA is shown to be defined by a single tandem switch and multiple POPs. The FIG. 9 TSA configuration is due to the overlapping in the access tandem trunk usage between end office 6 and end office 8. Note that the terminating tandem and DEOT service for end office 6 is provided by POP 2, while the DEOT and tandem service for end office 8 is provided by POP 20, which gains access to the access provider via SWC 22. The DEOTs connecting SWC 22 to end office 8, designated 22a and 22b, are different from the DEOTs connecting SWC 4 to end office 6. SWC 22 is connected to tandem switch 14 by only a terminating tandem trunk 24.

Figure 10:
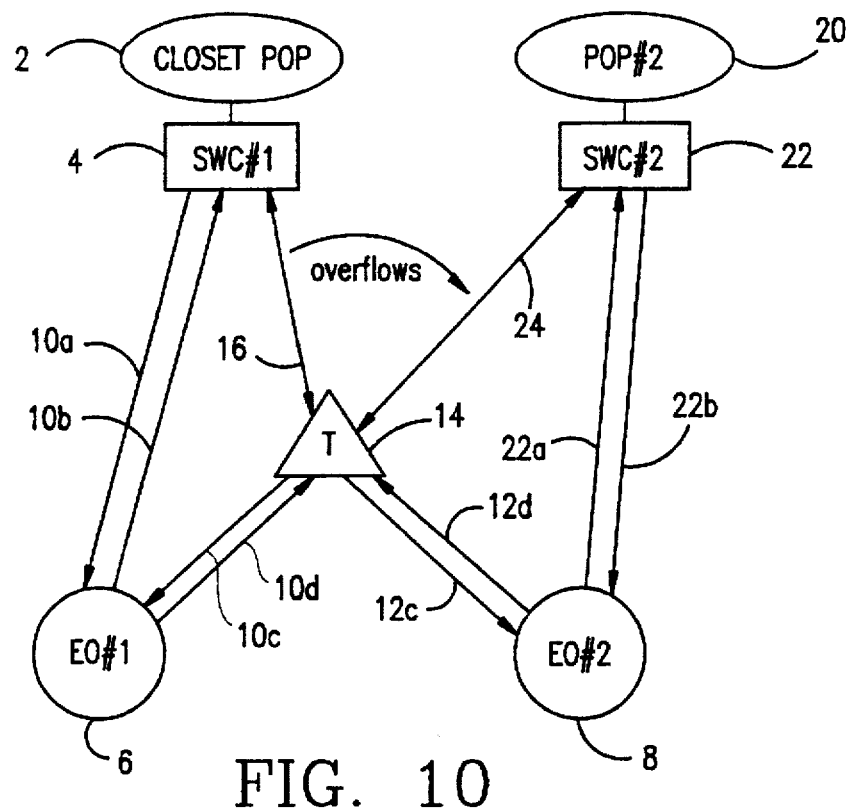

A variant of an overlapping TSA configuration is shown in FIG. 10. Here however the tandem trunk connection between SWC 22 and tandem switch 14 is bidirectional. Thus, the FIG. 10 TSA provides a configuration where end office 6 is served by a "closest pop" 2b with a non-final tandem trunk 16 that overflows to another POP's tandem trunk 24. For this configuration, the tandem trunk 24 of POP 20 is sized to include the overflow traffic of end office 6.

Figure 11:
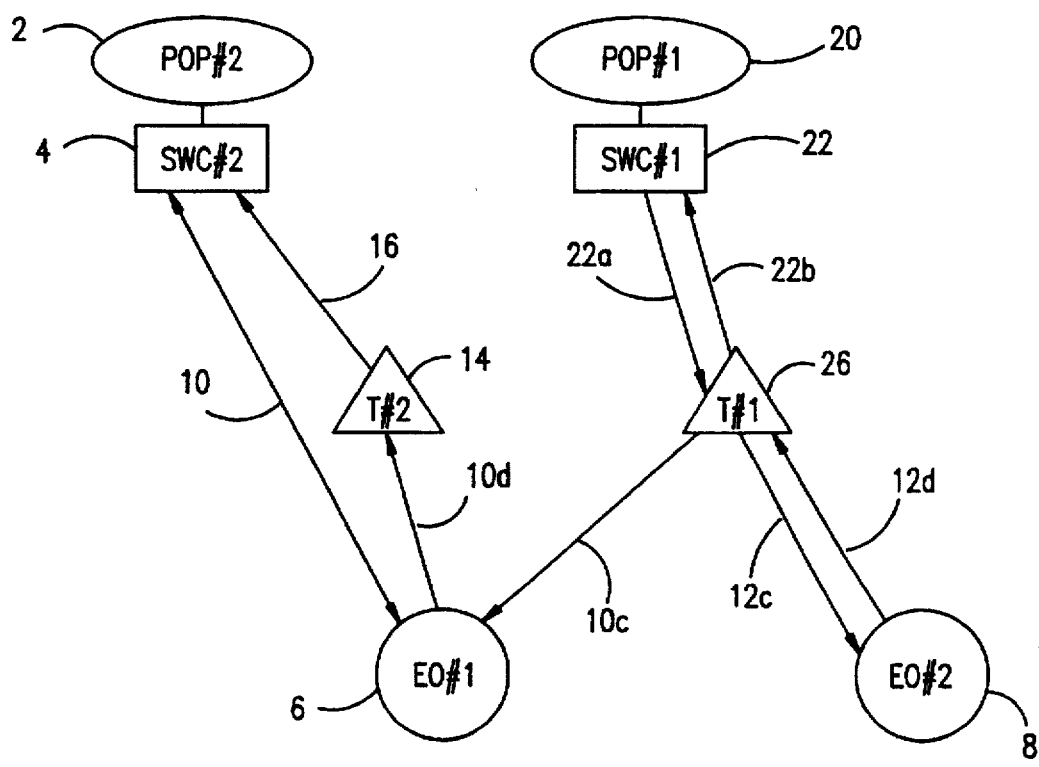

Another special TSA case is shown in FIG. 11. For this configuration, end office 6 uses a bidirectional DEOT 10 and a terminating tandem trunk 10d to connect to an access tandem switch 14 provided by one access provider. At the same time, end office 6 is connected by a terminating tandem trunk 10c to a terminating tandem switch 26 provided by a different access provider. Although the NAOMI system sizes each tandem trunk separately, a single defined TSA is used to maintain the concept that each end office is assigned to only a single TSA.

Although FIGS. 1, 9, 10 and 11 show at most two POPs, two end offices and two tandems, it should be appreciated that those are special cases for illustration only. In actuality each TSA may encompass a large number of POPs, tandem switches and end offices. Witness the defining of a TSA hereinbelow.

Figure 12:
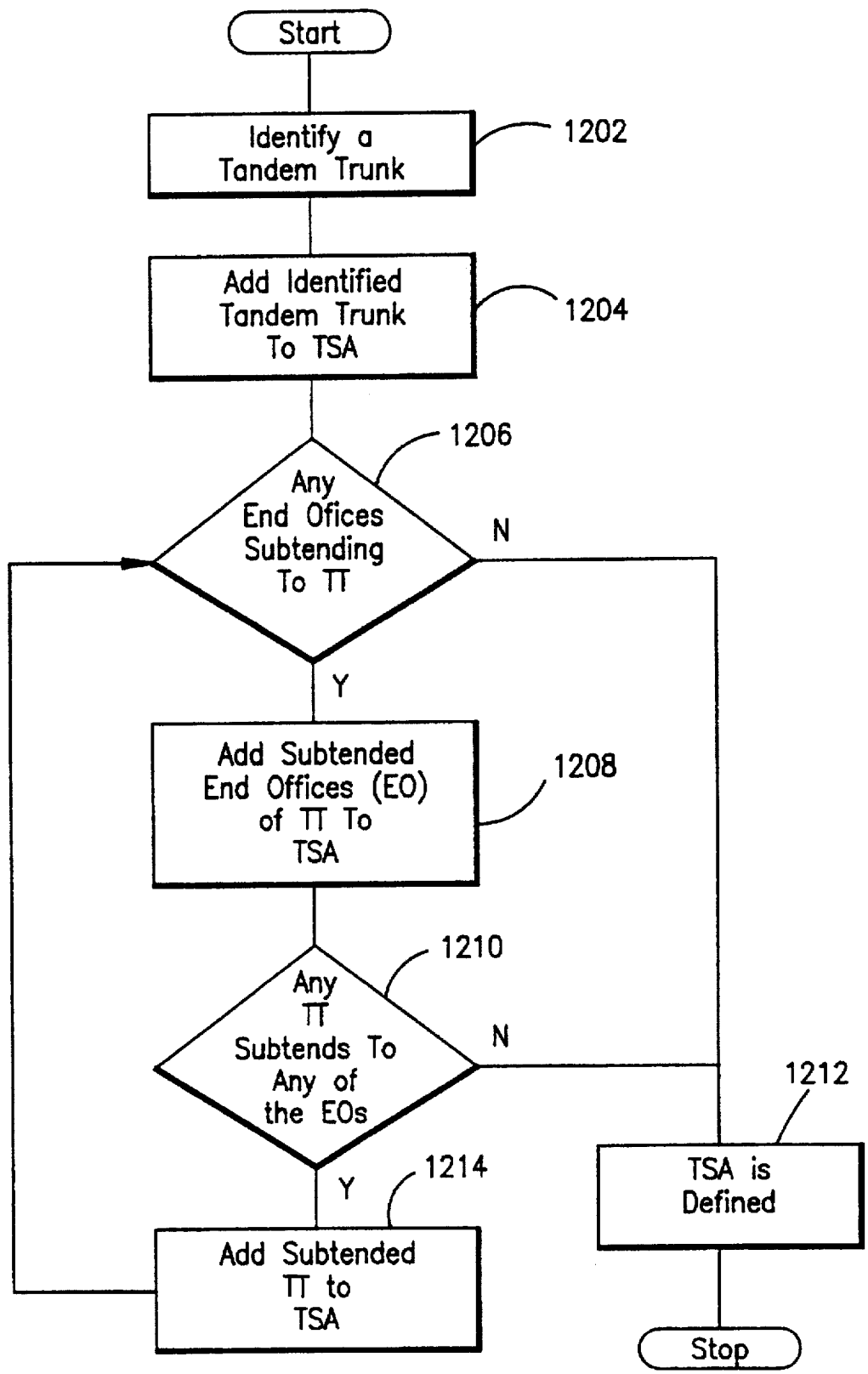
FIG. 12 is a flow chart illustrating exemplar steps for defining a TSA by the instant invention NAOMI system.

A flow chart illustrating the defining of a tandem service area is shown in FIG. 12. First, a tandem trunk is identified per block 1202. That tandem trunk is then identified to be part of the TSA being created per block 1204. The operation next proceeds to find if there is any end office subtending to the identified tandem trunk. This is represented by decision block 1206. If there is not, the TSA is considered to have been defined and the process is stopped. For the instance where there are no end offices subtending to a tandem, no TSA is defined. If there is at least one end office subtending to the identified tandem trunk, that end office is deemed to be part of the TSA, as designated by block 1208. Other end offices subtending to the same identified tandem trunk are likewise added to the TSA. Thereafter, a determination is made on whether any of those end offices has subtended thereto other tandem trunks. This is represented by block 1210. If there are none, the TSA is considered to have been defined per block 1212. The process then stops. If there are additional tandem trunks subtending from any one of the added end offices of the TSA, those subtended tandem trunks are added to the TSA, per block 1214. The process is then repeated by determining whether any end offices subtend to those now identified tandem trunks. Thus, according to the flow chart of FIG. 12, a TSA may in fact encompass a plurality of tandems and end offices.

Return to FIG. 4 and focus on create tandem service area subprocess 415. Note that once a TSA is created, the responsible personnel or user and the appropriate review schedule are assigned for that TSA. This may be done by the prepare user optimization request application process 304 and specifically by means of one of its subprocesses such as modify user tandem service area subprocess 544 shown in FIG. 5. Although new TSAs are generated for each periodic time period, for example weekly, once the review schedule and responsible user are assigned, that information is carried to each week's version of the TSA. As a new TSA is created, each POP and end office of that new TSA are checked to verify that the information necessary to compute the cost within that TSA is available. A TSA whose end office vertical and horizontal (V&H) coordinates, end office access provider, tandem access provider, or POP V&H coordinates are not available is flagged as containing error data and is reported on the exception report to exception report store 420.

Upon completion of the periodic traffic statistics update, subprocess 415 creates new default TSAs. Each TSA is identified by its tandem(s) and POP(s) and the traffic usage indicator (TUI) of the traffic routed through its trunks. A trunk with an exception TUI may be assigned as a TUI exception TSA. Such exception TUIs are stored in an exception TUI store 430. An exception TUI may be for example an 800 usage.

As a TSA is created, the V&H coordinates for each end office are validated. If the V&H coordinates are not found, that missing end office data is reported on the traffic update exception report and that TSA is identified to contain erroneous data. Similarly, the V&H coordinates of each POP's SWC are also validated. If the V&H coordinates are not found for a POP, that missing POP data is also listed on the traffic update exception report and the TSA is again identified as containing erroneous data. The same validation process is repeated for the access provider assigned to each end office. If the rate information for that access provider cannot be found, it is also reported on the traffic update exception report and the TSA is identified as containing erroneous data. TSAs configured with trunk traffic that is older than a given time period, for example four weeks, are deleted.

As shown in FIG. 13, TSA store 437 has stored therein data relating to the identifier of each TSA. The traffic engineer who is in charge of the TSA is designated the owner of the TSA. Moreover, the TSA store includes the TSA's creation date and its traffic usage indicator (TUI).

The outputs from create tandem service area subprocess 415 are provided to a tandem trunk store 432, an end office traffic store 434 and a TSA control store 436. As shown in FIG. 13, tandem trunk store 432 contains the tandem identifier CLLI, the top CLLI and the direction of the tandem trunk, i.e. be it access, terminating or bidirectional. End office traffic store 434 contains the end office identifier CLLI, the hourly CCS, the traffic flow direction the end office is adaptable to, be it terminating or access or both, the tandem trunk to which the end office is connected and the identifier of the POP to which the end office is directly connected by a DEOT. Tandem service area control store 436 contains the review schedule.

The next subprocess of the update access configuration process 301 is the update circuit subprocess 416. On a periodic for example weekly basis, circuit update information from SCOTS database 208 and NETPRO database 210 is provided to update circuit subprocess 416. The circuit update information is stored in a circuit store 438, shown in FIG. 13 to be residing within access configuration store 310. When a traffic engineer receives an access work order, he may decide to take action by first reviewing the status of the circuit as stored in circuit store 438. When update circuit subprocess 416 receives the updated circuit information, order actions for installing or activating the circuits are effected. The updated circuit information replaces the old circuit information.

As shown in FIG. 13, circuit store 438 has stored therein for each circuit the identifier of the switch to which the circuit is connected, the trunk group number to which the circuit belongs, the circuit ID, its count and its status.

The last subprocess of the update access configuration application process 301 is the maintain end office monthly history subprocess 417 shown in FIG. 4. Monthly traffic statistics are stored for each of the TSA's end office in end office monthly history store 440, shown in FIG. 13 as being part of access configuration store 310. The monthly average rate and high usage rate of originating and terminating traffic are computed from the periodic end office traffic for each of the end offices. The stored monthly statistics are used on an ad-hoc basis for reports. End office monthly histories that exceed a predetermined time period, for example 13 months, are deleted. Thus, as shown in FIG. 13, end office monthly history store 440 contains for each of the end offices the end office identifier, its monthly average, standard and maximum originating usages and its monthly average, standard and maximum terminating traffic usages.

Return to FIG. 3. After the periodic update of the data in access configuration store 310 has been completed by update access configuration application process 301, the current traffic statistics for each trunk is reviewed by the NAOMI system to determine if the performing thresholds of the trunk have been exceeded, or that an error condition exists. When the NAOMI system detects a tandem or DEOT usage alarm condition, the TSA that contains the alarmed trunk is identified as a candidate for optimization. This process is performed by the identify alarm condition application process 302.

In particular, as shown in FIG. 3, provided to identify alarm condition application process 302 are inputs from access configuration store 310, in the form of trunk traffic, and thresholds from a performance threshold store 312, also shown in FIG. 13. As shown in FIG. 13, the performance threshold store 312 contains the identifier of each trunk, the traffic engineer who is responsible for the trunk, the creation date of the performance thresholds relating to the trunk and the utility threshold for the tandems. From the access configuration store 310 shown in FIG. 13, it can be seen that the trunk traffic may be obtained from the traffic statistics store 428 and the end office traffic store 434.

A TSA that has been identified by the identifier alarm condition application process 302 is input to optimization candidate store 314. As shown in FIG. 13, optimization candidate store 314 contains for each of the candidate TSAs its identifier, the traffic engineer responsible for the TSA, the date it was deemed to be an optimization candidate, the reason why it is chosen to be an optimization candidate, the source from which the alarm was detected, and the creation of an access work order (AWO) flag to indicate to the traffic engineer that the TSA requires optimization.

In operation, the identify alarm condition application process 302 uses the most current traffic of a trunk to identify any alarm conditions. If a trunk is a tandem trunk, if its traffic usage indicator (TUI) is not identified as an exception TUI (per exception TUI store 316), and if its utilization rate meets or exceeds the performance threshold for tandem usage (as indicated per performance threshold store 312), the TSA that contains the trunk is determined to be an optimization candidate. The reason for identifying the TSA as an optimization candidate for this instance is its "tandem usage". On the other hand, if the trunk is a DEOT, if its TUI is not identified as an exception TUI, and if its utilization rate is below the performance threshold for DEOT usage, that TSA that contains the DEOT is deemed to be an optimization candidate. The reason provided for designating that TSA an optimization candidate for this instance is "DEOT usage".

When an optimization candidate is created due to an alarm condition, the current end office traffic for the TSA and the default performance thresholds for use in the optimization are specified. If however the difference between the trunk's enabled circuit count and the trunk's hit circuit count meets or exceeds the performance threshold for enable versus hit circuits, an access work order for the trunk is created and the reason set forth in optimization candidate store for this optimization is "enable versus hit". A "hit greater than enabled" is used as a reason for a trunk in alarm if that trunk's hit circuit count is greater than the trunk's enable circuit count.

In the instance where a bidirectional trunk has only one-way traffic, an access work order for identifying the trunk being in error condition is created and the reason given is "bidirectional with one-way". If a trunk is a DEOT, if its TUI is not an exception TUI, and if it has no tandem trunk specified for its overflow traffic, an access work order identifying the trunk as being in error condition is created. In addition, the reason given for this error is "no tandem". If both an access direct trunk and a terminating direct trunk exist for the same POP and end office, and the performance threshold bidirectional reporting parameters are set to "report", an access work order for the end office and tandem switch pair is created identifying the possibility of combining the direct trunks into a single bidirectional direct trunk. The reason given for the access work order then is "possible bidirectional". If a single direction trunk has two-way traffic and the traffic CCS exceeds the performance threshold for test traffic, an access work order for trunk identifying an error is created with the reason for the access work order being "single direction with two-way".

If more than one originating tandem trunk exists for the same POP and tandem within a TSA, an access work order for the TSA is created with the error condition being identified as "multiple same direction tandems". On the other hand, if more than one terminating tandem trunks exists for the same POP and tandem within a TSA, an access work order for that TSA is created with the reason given being "multiple same direction tandems". Finally, if there exists either an originating or terminating tandem trunk and a bidirectional tandem trunk for the same POP and tandem within a TSA, an access work order identifying the error as "multiple same direction tandems" is created. There are thus a number of alarm conditions which may be identified for the different trunks within a TSA.

The next process that the NAOMI system performs is the initiate scheduled review application process 303 shown in FIG. 3. Application process 303 is guided by an internal clock, which also may be used to regulate the maintain end office monthly history subprocess 417 shown in FIG. 4. For application process 303, an input is provided from access configuration store 310 as a TSA review increment signal on a periodic basis. Thus, each TSA is reviewed on a periodic basis to determine if that TSA continues to be configured in an optimal matter. By scheduling periodic reviews, the entire access network, not just those locations with alarm conditions, is continually monitored. The schedule for the periodic reviews may be developed by the manager of the traffic engineers and is stored in the tandem service area control store 436 of the access configuration store 310 shown in FIG. 13.

Upon completion of a scheduled review, the TSA under review is identified as a candidate for optimization with the reason given as "scheduled review". The TSA candidate is provided as an output to optimization candidate store 314. A TSA is not deemed to be an optimization candidate for a scheduled review if that TSA contains erroneous data, in which case that TSA is output to an exception report store 420, also shown in FIG. 13. When an optimization candidate for a scheduled review is created, the current end office profiles, the default performance thresholds and the access providers of that TSA are used for the optimization. Further, after an optimization candidate is created for a scheduled review, that TSA's last schedule review date is updated with the current update date.

The next application process performed by the NAOMI system is the prepare user optimization request application process 304 shown in FIG. 3. Application process 304 is particularly useful because a traffic engineer is often asked to evaluate a TSI with respect to its future increases in traffic, the addition of new end offices, the assignment of an end office to a different POP, etc. By incorporating application process 304, the NAOMI system enables the traffic engineer to specify a user or specific version of a TSI with changes to its POP and end office sites, tandem trunks, and end office traffic. It moreover enables the traffic engineer to specify a user version of the performance thresholds and an access provider's cost data.

Figure 5:
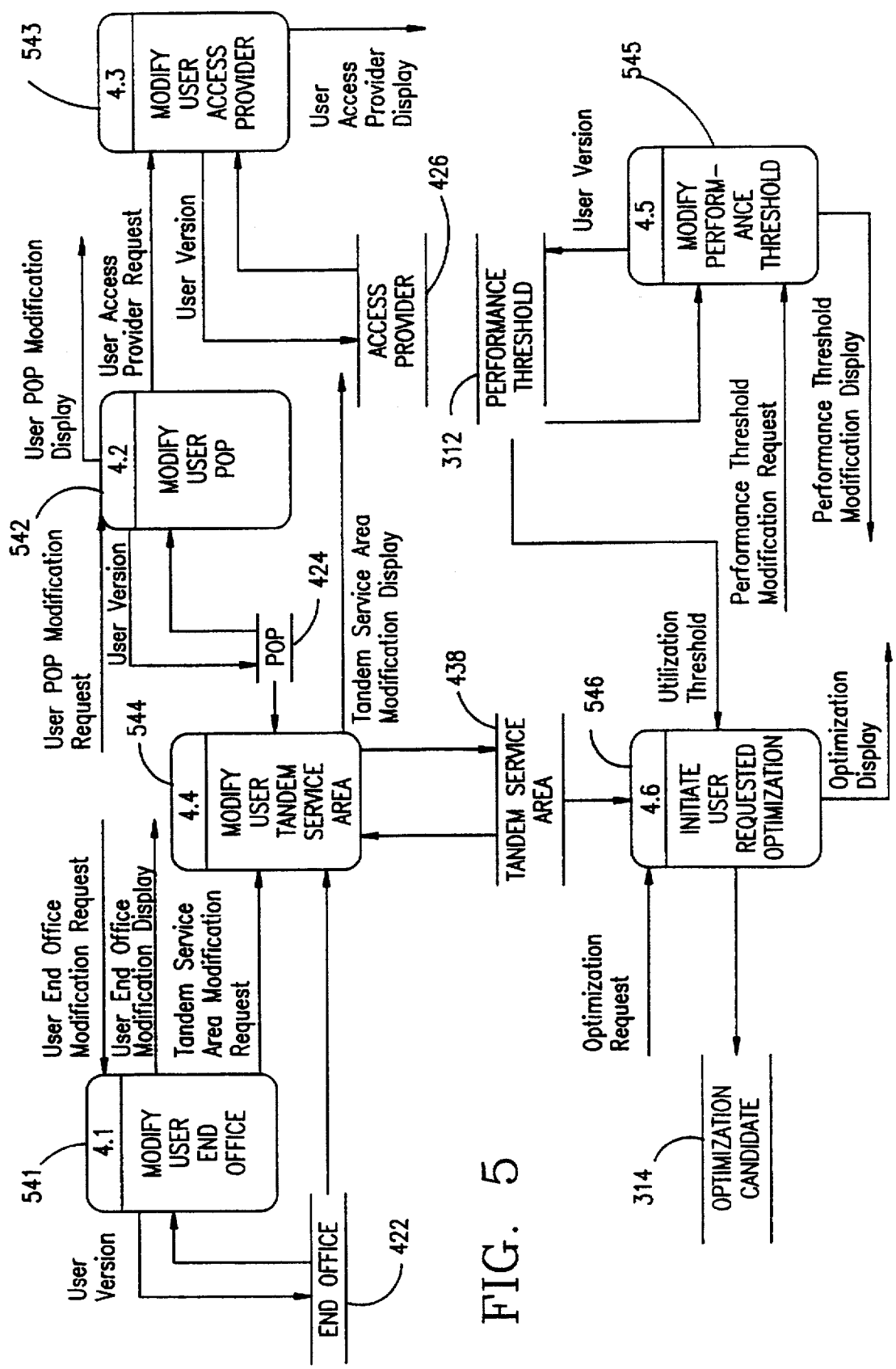
FIG. 5 is a diagram focusing onto the prepare user optimization request process illustrated in FIG. 3.

There are a number of subprocesses of application process 304. These subprocess are shown in FIG. 5 as a modify user end office subprocess 541, a modify user POP subprocess 542, a modify user access provider subprocess 543, the previously discussed modify user tandem service area subprocess 544, a modify performance threshold subprocess 545, and an initiate user requested optimization subprocess 546.

Modify user end office subprocess 541 enables operating personnel of the NAOMI system to create a user version of an end office. This end office may then be used in the generation of end office traffic for a user TSA. The operating personnel may create a new end office when evaluating the impact of new sites within the access network. To create a user end office, the user or operating personnel need to specify the user end office's CLLI code, the local access and transport area (LATA) for the end office, the vertical and horizontal coordinates of the end office, the end office access provider, and whether the end office is bidirectional capable, DEOT capable, DS3 provisioned or DS3 switch capable. The user or traffic engineer who created the user end office is deemed to be its user. Moreover, the end office may be selected from a list of all end offices, located within a specified LATA or a specified TSA or otherwise. The selected end office may be displayed to the user, per an unshown terminal, or be provided as a printed report. If the identifier of the end office is modified, then that modification is noted in the end office store 422, which is also shown in FIG. 13. An end office may be deleted by the user who created or owns it. Such deletion is allowed only if the end office is not specified to have traffic.

Modify user POP subprocess 542 is the next function performed by application process 304. It is activated when a POP modification request is input by a user. Data relating to the POP which is to be modified is retrieved from POP store 424. The modified POP is reinserted to POP store 424 after modification. The modified POP is displayed to the user. Specifically, the POP identifies the SWC at which the wide area service provider gains access to the local area access provider. The mileage from the SWC to the end office is used by the NAOMI system to compute one of the access costs.

From POP store 424, it can be seen that to create or modify a POP, the POP's identifier, its LATA, and its horizontal and vertical coordinates are used. Whether or not a POP is circuit constrained, as for example if the POP is a closet or leased POP as discussed above or is restricted to DEOT or tandem trunk circuits, is also specified. The POP is identified as belonging to the user that created it. Similar to subprocess 541, a user may select a POP from a list of all POPs, be it belonging to a specified user or falling within a specified LATA. In addition to a display, a printed report can also be provided to the user. A user may also delete his own POP, provided that there are no tandem trunks subtending to that POP.

Another subprocess that is performed by application process 304 is the modify user access provider subprocess 543. As was noted previously, the access provider can be a local exchange carrier (LEC) or a competitive access provider (CAP). The access costs (for the wide area service provider) are based on the entrance facility costs, the fixed rate or costs, the mileage rate, and per minute costs charged by the access provider. Note that most of those costs are mandated by the FCC and may in fact be different for different access providers. For the NAOMI system, a user may create a user access provider whose rates may be used for optimizing the TSA.

Upon receipt of the user access provider request, the modify user access provider subprocess 543 retrieves the appropriate data from access provider store 426. Once modified, the user access provider is output by subprocess 543 to access provider store 426 as an update. The information relating to the access provider modified by the user can be displayed to the user or be provided as a printed report.

In creating a user access provider, the identifier of the access provider, its entrance facility costs, its DEOT fixed and per mile costs, its tandem fixed per minute and per mile costs, and non-recurring costs (NRCs) are provided to modify user access provider subprocess 543. The user who modifies the access provider is deemed to be the owner of that access provider. The access provider may be selected from a list of all access providers or it may be selected from a list of all access providers that belong to a specified user. A selected user access provider may be deleted only if no end office specifies that access provider.

The modify user tandem service area subprocess 544 was discussed earlier with respect to the defining and creation of a TSA. To repeat, a tandem service area is deemed to comprise a set of tandem trunks and all end offices that subtend to those tandem trunks. Data relating to the TSA that is to be modified is provided to modify user tandem service area subprocess 544 from tandem service area store 438. In addition, subprocess 544 retrieves information relating to the end office from end office store 422 and POP data from POP store 424. Its output may be displayed to the user as a video display or a printed output. There are a number of subprocesses of subprocess 544. These subprocesses are shown specifically in FIG. 6.

Figure 6:
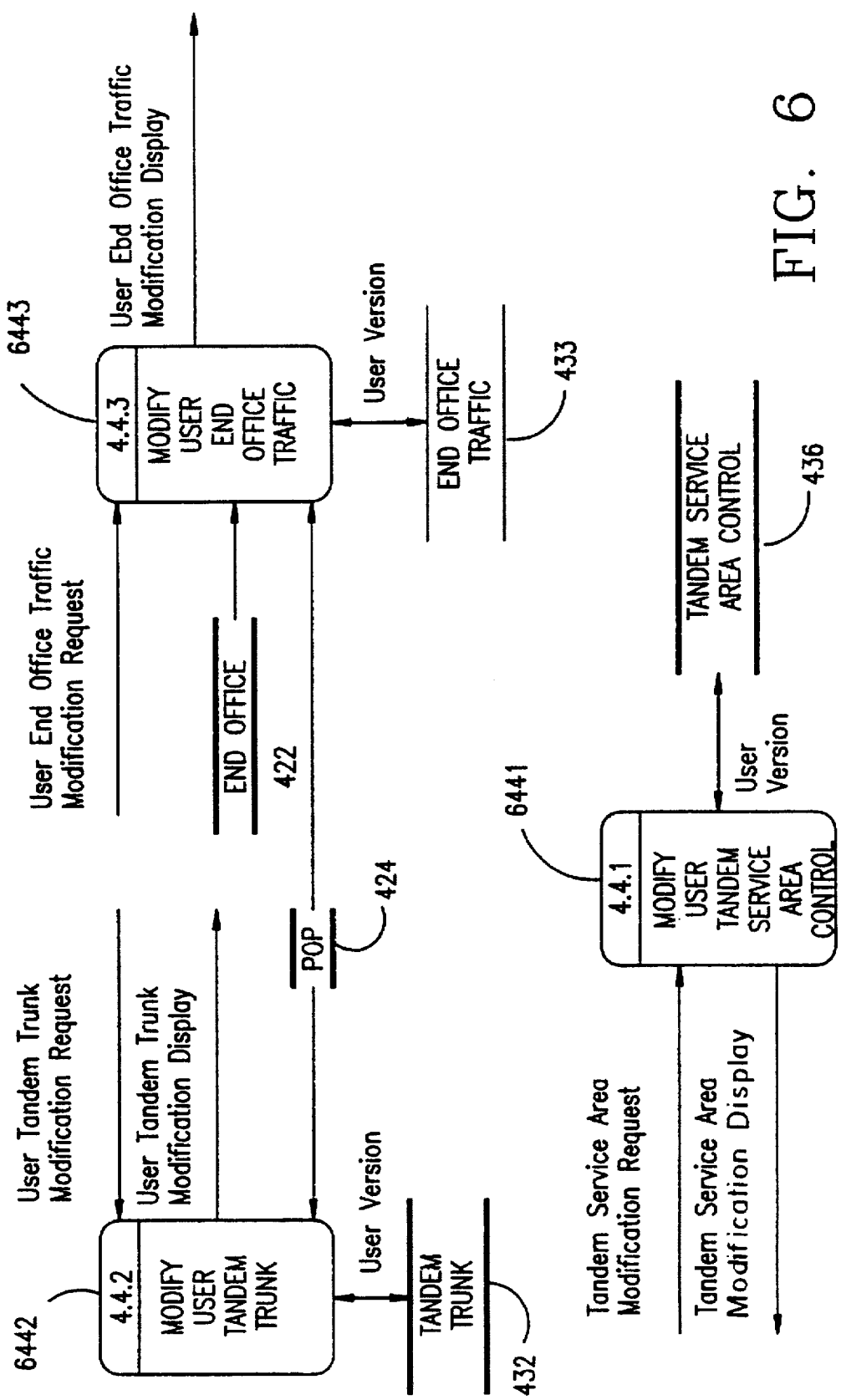
FIG. 6 is a diagram illustrating in further detail the process of modifying a TSA shown in FIG. 5.

As shown in FIG. 6, there are three subprocesses performed by subprocess 544. These subprocesses are identified as modify user tandem service area control subprocess 6441, modify user tandem trunk subprocess 6442, and modify user end office traffic subprocess 6443. Subprocess 6441 is used to identify the TSA and also to specify the user responsible for and the review schedule of that TSA. The review schedule is retrieved from tandem service area control store 436. As before, once reviewed, the schedule date is updated. A user of the NAOMI system can request modification of the TSA by using subprocess 6441. Some of the parameters that may be modified include the TSA's name, its responsible user and its review schedule. A TSA may be selected from among a list of TSAs, all TSAs belonging to a particular user, a list of default TSAs or TSAs that belong to a LATA. In addition, all TSAs that have tandem trunks connected to a particular tandem switch site, or through a specified POP site or a specified end office may also be selected. As a safeguard, only a user with a given authorization level may modify a selected default TSA control. The data relating to the different users of the NAOMI system are stored in user store 442 shown in FIG. 13. A percentage to be applied to all hourly traffic CCS for all end office traffic within a selected user TSA may also be specified.

Subprocess 544 has a second subprocess 6442 for modifying the user's tandem trunks. As discussed earlier, a tandem trunk carries traffic from subtending end office, and is identified by the POP and tandem site connected by the trunk and the trunk's direction. The data relating to the tandem trunk is retrieved by subprocess 6442 from tandem trunk store 432. In addition, subprocess 6442 retrieves data from POP store 424. Using subprocess 6442, a tandem trunk may be created to service a user TSA. The tandem trunk may be selected from a list of all tandem trunks for a specific TSA. When a user deletes a selected tandem trunk, all end offices subtending to that tandem trunk also have to be deleted. Information relating to the selected tandem trunk may be provided as a display or a report to the user.

Modify user end office traffic subprocess 6443 is used to modify the TSA's DEOT and tandem trunk configuration. When evaluating future traffic trends and their impact on the access configuration, a user must be able to modify the total traffic for an end office. As input, subprocess 6443 retrieves information from POP store 424 and end office store 422. Moreover, it retrieves from the end office traffic store 433 the various data relating to the traffic traversing through the of interest end office. It is activated when a modification request is received, and its output may be provided as a display or a printed report to the user. Similar to the other subprocesses, subprocess 6443 allows a user to request the creation of a user end office traffic that subtends a tandem trunk within a user's TSA. Subprocess 6443 also allows a user to select an end office traffic from a list of all end office traffic for a specific TSA. In addition, monthly histories for a selected end office traffic may be displayed to the user. Furthermore, the user can specify a percentage to be applied to all hourly traffic CCS for an end office traffic, as shown in end office traffic store 433.

With reference to FIG. 5, another subprocess of prepare user optimization request application process 304 is the modify performance threshold subprocess 545. A performance threshold is a set of parameters used by the NAOMI system to identify alarm conditions, to determine decision points in its optimization process, and to control its data management activities. The default performance threshold is maintained by a traffic engineer manager, but any user of the NAOMI system can create a user performance threshold for optimization. Performance threshold data is retrieved by subprocess 545 from performance threshold store 312, in response to a performance threshold modification request. Only a user with manager authorization may create the default performance threshold. See FIG. 2 with respect to RAM manager 218. The types of thresholds required include the tandem utilization threshold, the DEOT utilization threshold and the enable versus hit circuits threshold. Other parameters provided to subprocess 545 include the number of days to retain the access work order, the minimum percent change for access work order creation, the bidirectional reporting parameter, and the maximum test traffic. A user performance threshold may be created by a user for his own use.

The last subprocess of the prepare user optimization request application process 304 is the initiate user requested optimization subprocess 546. This subprocess enables a user to request the optimization of a TSA at any time. The TSA may be a default (current) configuration or a user defined configuration. For this subprocess, a utilization threshold for the TSA and tandem trunks is provided as an input. Subprocess 546 outputs a TSA candidate for optimization to optimization candidate store 314. The thus stored TSA candidate is then fed to the optimize DEOT and tandem configuration application process 305 shown in FIG. 3.

Once a TSA to be optimized is identified as an optimization candidate, the various costs for the access provider are determined. Such costs may include the per circuit access costs for both the DEOT and the tandem trunks for each of the end offices in the TSA. The NAOMI system then calculates the minimum number of DEOTS and tandem trunks needed to support the traffic load at the specified tandem utilization level or grade of service. Thus, optimize DEOT and tandem configuration application process 305 optimizes the configuration of direct and tandem trunks by determining an optimal or smallest number of those trunks for connecting the POP of the wide area service provider and the particular end office or end offices of the access provider at a minimal cost.

Figure 7:
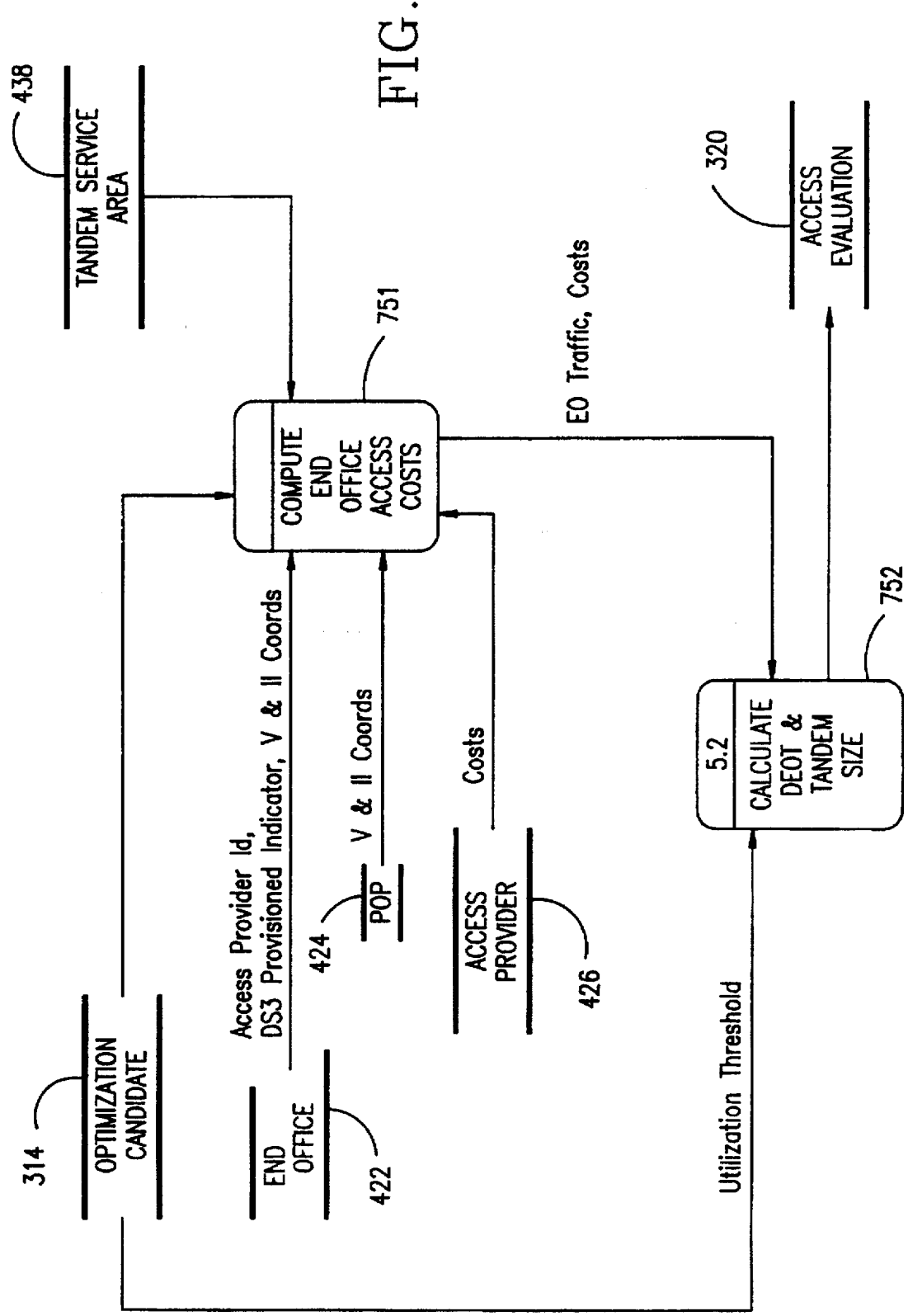
FIG. 7 is a diagram further elaborating the operations performed by the optimized DEOT and tandem configuration process illustrated in FIG. 3.

There are two major functions performed by application process 305. These functions are the determination of the different costs associated with optimization and the sizing of the direct and tandem trunks. These subprocesses are represented by compute end office access cost subprocess 751 and calculate DEOT and tandem size subprocess 752, respectively, shown in FIG. 7.

With reference to compute end office access cost subprocess 751, the per circuit costs of accessing each end office in the TSA identified as a candidate and retrieved from optimization candidate store 314 is calculated for DEOT and tandem trunks. The rates, or tariffs, used are those of the access provider whose end office is identified in the end office traffic store 434 for the TSA and the access provider store 426 assigned to the tandem location. Further provided as inputs to compute end office access cost subprocess 751 are the access provider ID, the DS3 provisioned indicator, and the vertical and horizontal coordinates retrieved from end office store 422. Whether or not an end office is DS3 capable is also retrieved from end office store 422.

If the end office is already accessed via a DS3 trunk or specified as DS3 capable, DS3 costs are used. If the end office is not identified as capable of DS3 access, DS1 costs are used. When an end office is identified as being serviced by an intermediate hub, DEOT costs are computed using DS3 costs from the POP to the intermediate hub and DS1 costs from the intermediate hub to the end office. By retrieving the per circuit cost for DEOT service using the access charges identified for the access provider from access provider store 426, the per circuit costs for DEOT service is calculated. Likewise, the per circuit cost for tandem trunk service is calculated using the access charges identified for the access provider specified for the tandem location. If an access provider is not specified for an end office or a tandem site, the National Exchange Carrier Association (NECA) access rates filed by the NECA with the FCC are used.

Also being calculated as a cost is the per circuit cost for DEOT service using the mileage from the end office to the POP to which the DEOT connects. The per circuit cost for tandem trunk service using the mileage from the end office to the POP to which the tandem switch connects is also computed. As was noted previously, depending on the capability of the end office, be it DS3 or DS1 capable, DS3 or DS1 costs are used for computing the per circuit access charge to the end office. In addition, from access provider store 426, the entrance facility costs which relate to the gaining of access by the POP to the local access provider is retrieved for computing the fixed entrance facility charges.

In sum, the compute end office access cost subprocess 751 computes an end office's DEOT per circuit cost as the sum of the entrance facility cost per circuit, the circuit fixed rate cost, and the circuit mileage rate cost multiplied by the miles from the DEOT SWC to the end office. The end office's tandem per circuit per minute cost is calculated by subprocess 751 to be the sum of the entrance facility cost per circuit, the circuit fixed minute of use rate cost and the circuit per mile per minute of use rate cost multiplied by the miles from the tandem SWC to the end office.

The respective sizing of the DEOT and tandem trunks are calculated by calculate DEOT and tandem size subprocess 752. The access configuration for all end offices served by a TSA is evaluated by using the hourly traffic and per circuit costs for each of the end offices and the tandem usage thresholds. As inputs, calculate DEOT and tandem size subprocess 752 retrieves the utilization threshold data from optimization candidate store 314 and the end office traffic, costs etc., that were input to subprocess 751 and calculated thereby. Subprocess 752 then calculates a recommended optimal configuration of the DEOTs and tandem trunks needed to service the candidate TSA and an estimated cost for that optimal configuration. The TSA's DEOT and tandem trunk sizes, with respect to the number of circuits per trunk, are optimized to minimize the access cost. The optimal number of DEOT and tandem trunks for a TSA is determined by using each end office's hourly traffic CCS adjusted by the optimization candidate's traffic multiplier.

If the end office is not capable of carrying bidirectional service, the DEOT and tandem trunk configuration is optimized by using uni-directional trunks to that end office. If an end office is not capable of receiving DEOT traffic, no DEOT is recommended by the optimization process to be connected to that end office. If the end office is service switching point (SSP) capable, the DEOT and tandem trunk optimization process configures the size of the end office to include 800 traffic with other originating traffic for that end office. On the other hand, if the end office is not SSP capable, the DEOT and tandem trunk optimization process sizes access to the end office for 800 traffic separately from the other originating traffic. In that instance, no DEOT is recommended to carry 800 traffic to that end office.

From the calculate DEOT and tandem size subprocess 752, access evaluation data for the being optimized TSA is produced and stored in an access evaluation store 320. As shown in FIG. 13, access evaluation store 320 stores for each TSA an identifier, the optimization run date for that TSA, the reason for the optimization, the optimal number of tandem trunks and DEOTs for each end office, the estimated cost for servicing the input TSA at its current utilization level, and the estimated cost for servicing the recommended TSA configuration at the requested utilization level. Upon creation of the access evaluation data for the TSA identified as a candidate in optimization candidate store 314, that optimization candidate is deleted from the optimization candidate store 314.

An exemplar algorithm which may be used for performing the optimization process includes first building an objective function that represents the major components of the local transport restructuring (LTR) cost, namely the leased DEOT costs, per minute DEOT overflow costs to the tandem, and the entrance facility costs. The objective function could then be used as a basis for determining the costs of any given TSA configuration. With a configuration in which the number of DEOTs have been specified (as for example per the operations discussed with reference to FIG. 12 for defining the TSA), the DEOT overflow traffic could be calculated using the conventional Erlange-B statistics and the required number of tandem circuits corresponding to a specified grade of service computed using the conventional Neal-Wilkinson theory for telephony. The actual optimization could then be conducted as an iteration over a multi-branched tree structure. The root of the tree corresponds to zero DEOTS at each of the end offices in the TSA, and each of the other nodes in the tree corresponds to a specific number of DEOTS at each end office. One additional DEOT is added as the process moves from node to node down the tree. The iteration is performed by beginning at the root and systematically moving down the branches of the tree. As it is moved, the "best solution found so far" is kept and a lower bound on the best solution possible is computed by continuing down a lower branch, by computing the cost of the DEOTs at the next lower node in the tree. When the lower bound exceeds the best solution so far, the branch is "pruned", and the process backtracks up the tree one node at a time and proceeds to analyze a new branch. When all branches are pruned, the "best solution so far" provides the least cost solution to the optimization process under consideration. For this analysis, a TSA is assumed to represent the smallest configuration of end offices, DEOT trunks, and tandem trunks for which a valid optimization can be performed.

Once an optimization result is obtained, it may be provided as a display to the user. This application process is represented by provide optimization results application process 306 shown in FIG. 3. Specifically, the user of the NAOMI system can review the results of the optimization in two levels of detail, namely the data provided by the access evaluation store 320 which provides a summarized view of the recommended DEOT and tandem trunk configuration, and the access work orders generated from that access evaluation that identifies specific changes to be made to the size of existing trunks. The access work order is stored in access work order store 318. The two levels of detail are further illustrated in FIG. 8.

Figure 8:
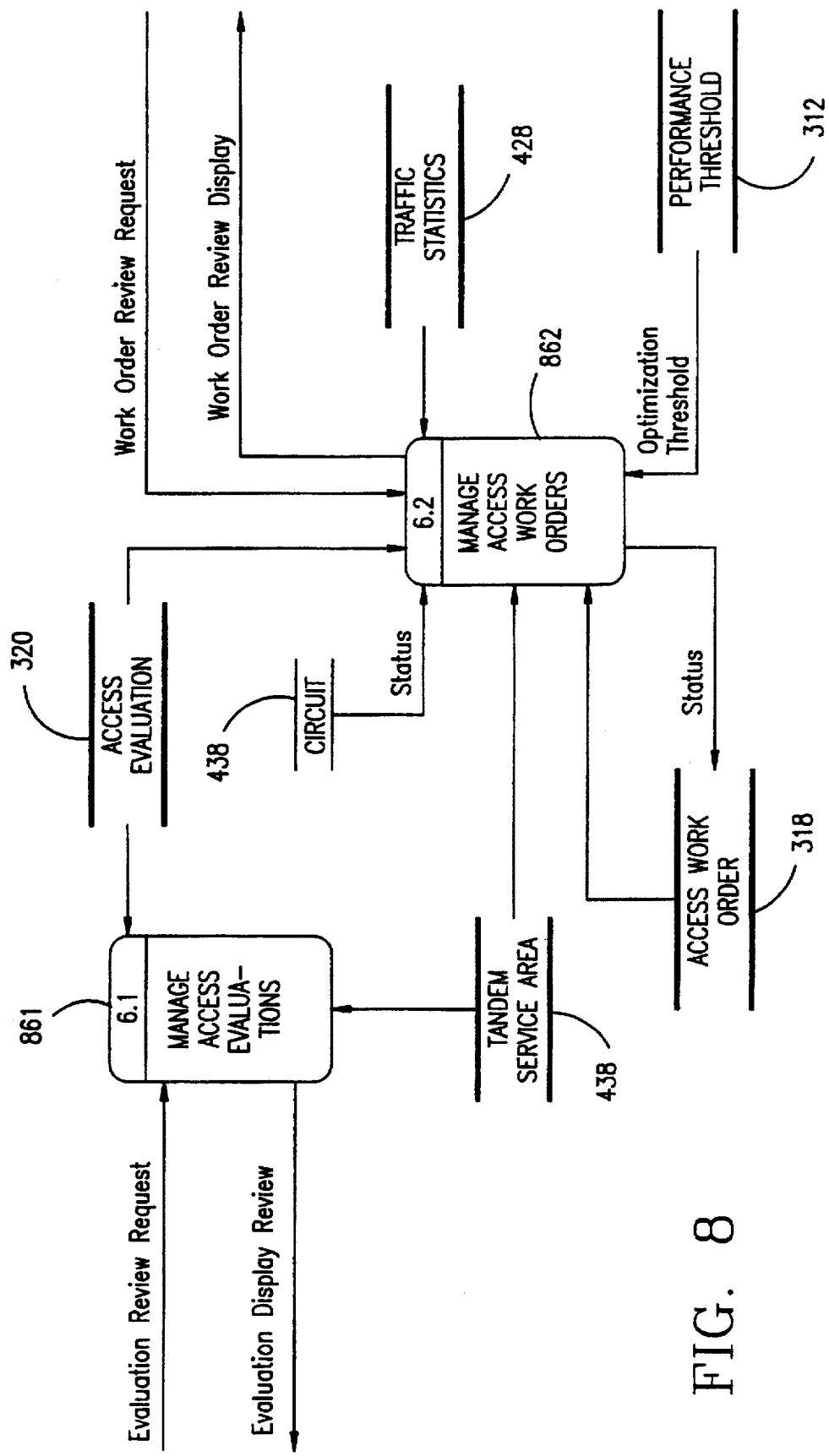
FIG. 8 is a diagram focusing onto the provide optimization results process shown in FIG. 3.

As shown in FIG. 8, manage access evaluation subprocess 861 identifies the recommended DEOT and tandem trunk configuration for the TSA based on the end office traffic profiles, the tandem usage thresholds, and the access costs for the access provider to which the TSA is a part of. Upon receipt of an evaluation review request, data relating to the access evaluation is retrieved from access evaluation store 320 and data relating to the TSA is retrieved from tandem service area store 438. With the NAOMI system, a user can select an access evaluation from a list of all access evaluations, for a specific TSA or otherwise. Furthermore, a user can select an access evaluation with an optimization run date on, before or after a user specified date or from a list of all access evaluations owned or assigned to a specific user. The evaluation display can be provided to a user as a video display via his terminal or as a printed report. Only a user with manager authorization can delete all access evaluations with a creation date on, before or after a user specified date. When an access evaluation is deleted, all access work orders associated with that access evaluation are also deleted. To keep data from being too cluttered, an access evaluation that is over 13 months old is deleted.

The other subprocess of provide optimization results application process 306 is the manage access work orders subprocess 862. When a TSA is evaluated, and the configuration of that TSA is determined to be capable of being improved, an access work order is created for each trunk that needs to be changed, added or deleted. The traffic engineer then uses the access work order to track the servicing changes to be made, the access network and report to his manager and the status of the changes. Information from an access work order is presented in a format that facilitates the initiation of a circuit order form. Information from the SCOTS and NETPRO databases provides a current status of circuits impacted by an access work order. As shown in FIG. 8, a number of inputs are provided to manage access work orders subprocess 862, in response to a work order review request. These inputs include data from the access evaluation store 320, the circuit store 438, the tandem service area store 438, the traffic statistics store 428 and the performance threshold store 312. In addition, the access work order is input from access work order store 318.

In terms of any access work order, manage access work order subprocess 862 determines the costs of the recommended TSA configuration by adding the non-recurring costs (NRCs) charged by the access provider to achieve the configuration to the product of the daily cost of the optimal DEOT and tandem trunk configuration multiplied by the in service days threshold. A further explanation of such non-recurring costs will be given later with reference to the displays presented to the user in FIGS. 17 and 20. Furthermore, the costs of the original DEOT and tandem trunk configuration, at its current utilization level for the TSA, is determined by multiplying the daily costs of the current configuration by the in service threshold. If the difference between the current configuration costs and the recommended configuration costs does not exceed the threshold minimum for creating the access work order, the access evaluation is identified as "not recommended due to NRC". If the trunk statistics exists for the end office traffic upon which the access work order is based, the trunk to be changed, as well as the number of circuits to be added or deleted, are identified. Different variations of displays containing different information may be provided to the user either in a video or printed format.

Some of the displays provided to the operating personnel of the NAOMI system that may enhance the understanding of the invention are discussed herein. With reference to FIG. 14, a TSA summary that shows the trunks and end offices of an exemplar TSA is shown. The name of the TSA is identified as ABLNTXOR15T ('15T) at 1402 in the TSA summary line. The POP of the TSA is identified as AIN and designated at 1402a. The type of traffic traversing in TSA ('15T) is determined to be a standard type of traffic designated at 1402b. The three tandem trunks associated with TSA '15T, designated 1404a, 1404b and 1404c, are shown under the heading "Tandem Trunks". One of the tandem trunks, namely LUB2-1291 ('291), designated at 1404a, is highlighted. The '291 tandem trunk is identified by its switch LUB2, and port 1291 to the switch. Scanning along the highlighted line of tandem trunk '291, it can be seen that that tandem trunk was last modified on Aug. 24, 1994 at time 16:48:05. The circuit ID is also identified, as is the user. For highlighted tandem trunk '291, four DEOTs are shown to subtend or overflow therefrom. These DEOTs are identified at 1406a ('212), 1406b ('254), 1406c ('255) and 1406d ('336). Each of the four DEOTs is identified with its own circuit ID and, although not shown, the direction capability of each trunk, be it terminating, accessing or bidirectional, is also identified.

Proceeding downward on the screen of FIG. 14, the number of end offices subtending to highlighted tandem trunk 291 are shown. Given that there are four DEOTs, there must be at least four end offices. However, as shown in FIG. 14, there are five end offices, designated at 1408a, 1408b, 1408c, 1408d and 1408e. In fact, there may be additional end offices subtending to tandem trunk '291. The reason for the multiple number of end offices is due to the fact that some of those end offices may not be DEOT capable. In other words, a user cannot configure a non-DEOT capable end office to accept a DEOT. Alternatively, it could be that it is not cost effective to connect a given DEOT from a particular POP to the end office. For example, the traffic traversing from the POP to the end office does not justify paying for a DEOT because of its low volume. If that is the case, all traffic traversing between the that particular POP and the given end office has to go over tandem trunks. Accordingly, there are more than four end offices shown in FIG. 14.

With respect to the end offices subtending to tandem trunk '291, the originating traffic traversing through each of the end offices is shown under the heading EOOrig. The next column with the heading EOOrig800 shows the number of minutes for which 800 calls originate from that end office. For example, for the end office at 1408a ('CGO), there were 390 minutes of 800 originating calls. In contrast, there was only one minute of 800 originating calls from the end office at 1408b ('DSO) for a 24 hour period. The next two columns, identified as EOTBH and EOTerm, respectively, show that there were 0 minutes for the end office shown. This may be due to the fact that none of those shown end offices is bidirectional. Rather, all of those end offices are access end offices so that no terminating traffic is received.

The next column entitled Day800 shows the total number of minutes during a 24 hour time period in which 800 traffic traverses through the end offices. The last column shows the number of minutes that traffic traverses through each of the end offices.

Figure 15:
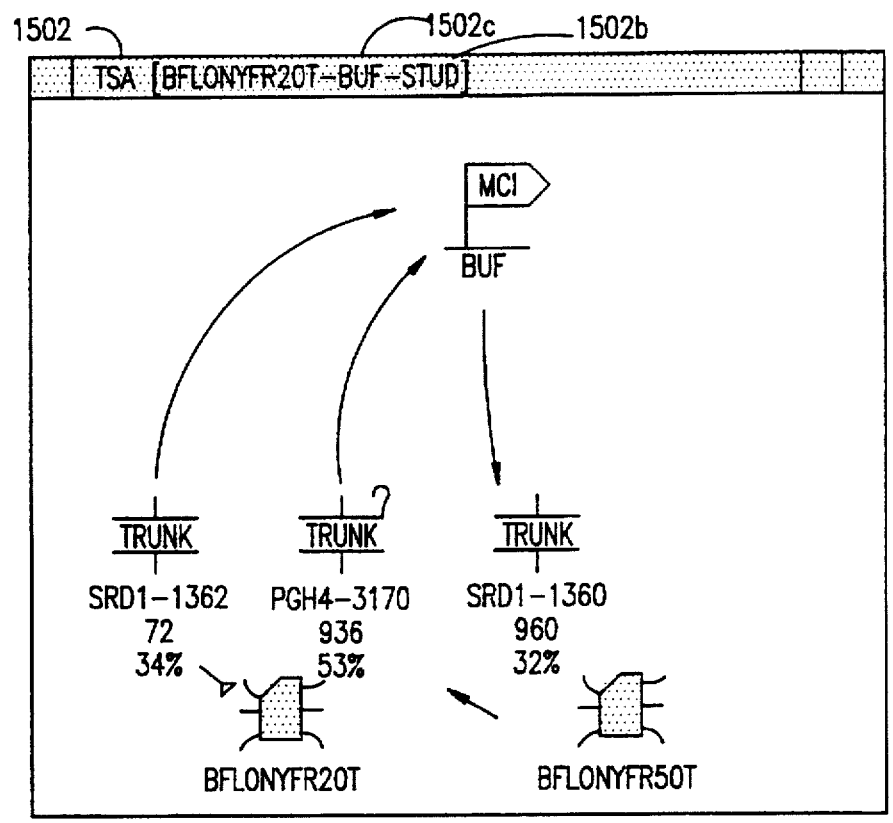
FIG. 15 is an exemplar graphical display of an exemplar TSA with tandem trunks.

FIG. 15 is a graphical view of a TSA with tandem trunks. The name of the exemplar TSA is identified per highlighted line 1502 as BFLONYFR20T ('20T). The POP to which TSA ('20T) is connected is identified as BUF, as designated at 1502*a*. The type of service is again standard, as designated at 1502*b*. POP BUF is shown to be represented by a flag on the display. Connected to POP BUF are three tandem trunks, identified as SRD1-1362 ('362), PGH4-3170 ('170) and SRD1-1360 ('360), respectively. Tandem trunk '362 is shown to be connected from POP BUF to tandem switch BFLONYFR20T ('20T) having the same name as TSA '20T. The other two tandem trunks '170 and '360 are shown to be connected to tandem switch BFLONYFR50T ('50T). Of the three tandem trunks, note that the arrows for trunks '362 and '170 are directed to POP BUF while that of trunk '360 is directed to tandem switch '50T. By convention, this means that tandem trunks '362 and '170 are access trunks while tandem trunk '360 is a terminating trunk. Note further that only access trunk '362 connects POP BUF with tandem switch '20T, while both access trunk '170 and terminating tandem trunk '360 connect POP BUF to tandem switch '50T.

As for the different trunks, it can be seen that trunk '362 has 72 circuits and is being used at a utilization rate of 34%. On the other hand, trunk '170 has 936 circuits operating at a utilization rate of 53%. Finally, trunk '360 has 960 circuits and is being utilized at a rate of 32%. A utilization rate of 100% means that the trunk is completely filled with traffic and additional calls are blocked. From a traffic engineer's viewpoint, that is something that should not be allowed to occur. The operating personnel of a wide area service provider can set the utilization threshold to whatever number is desired. For the instant discussion, assume a predetermined utilization rate (of traffic traversing in a trunk) of 75%. This 75% usage rate may also be referred to as the usage level grade of service. It in essence provides a threshold informing the traffic engineer of how much blocking he is allowed to have. What type of call blocking is acceptable of course is an economic and marketing decision. On the one hand, if a call is not completed, a service provider will not make any money. On the other hand, if the connect or access rate is such that all calls are ensured not to be blocked, the cost for such non-blocking could conceivably be more than the received revenue. Thus, the traffic engineer's job is to make sure that trunks are sized so that no traffic or only a minimum amount of traffic is blocked and also that the trunks are not sized so large that the wide area service provider pays for circuits that are not used.

Again with reference to FIG. 15, it can be seen that the usage rate of 34% for trunk '362 is somewhat low, when compared to the predetermined 75% usage. Thus, when the as shown TSA is again optimized, it resizes the capacity of trunk '362 so that the cost of using that trunk is rebalanced, with the capacity of the trunk running higher than 34%. Note however that because of the way that rates are established by the access provider, it may turn out that it is more cost effective to have lots of DEOTs so that the utilization rate on the tandem trunks remains low. Further note that the usage percentage for each trunk is monitored and can be tied to alarms so that when the usage rate for a trunk gets too low (or high), a request for optimizing the TSA is sent.

Figure 16:
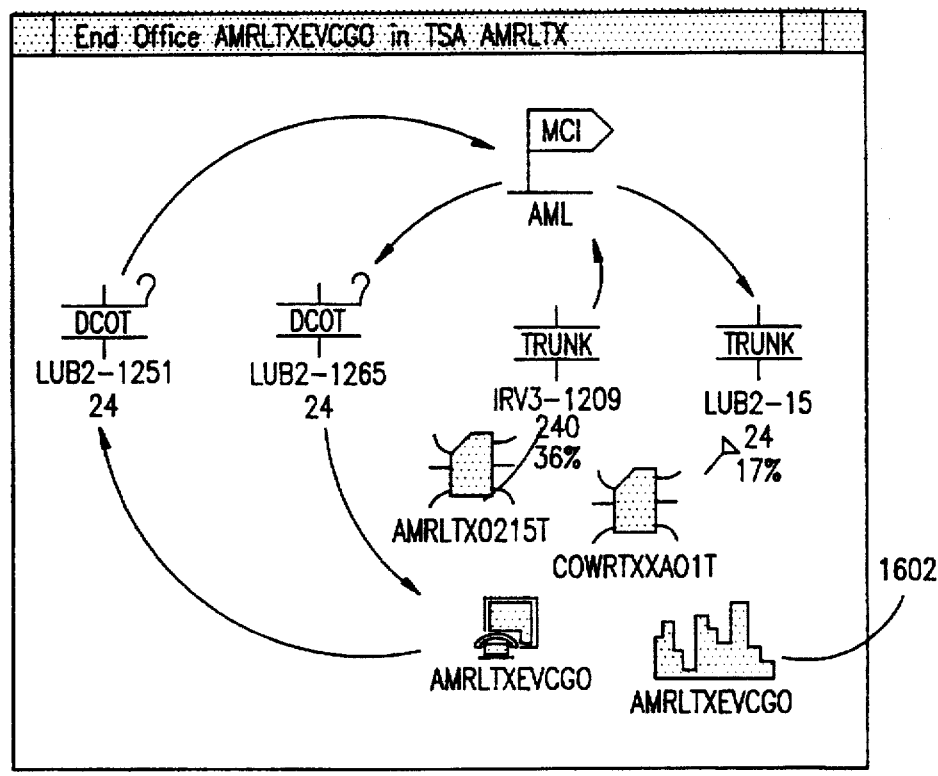
FIG. 16 is another graphical display illustrating an exemplar TSA from an end office's perspective.

A graphical display showing a TSA from the perspective of an end office is shown in FIG. 16. The exemplar end office is identified as AMRLTXEVCGO ('CGO). The POP to which the end office is connected is identified as AML. Shown being connected between AML and end office 'CGO are two DEOT trunks LUB2-1251 ('251) and LUB2-1265 ('265). Each of the DEOT trunks is shown to have 24 circuits. DEOT trunk '251 is an access trunk while DEOT trunk '265 is a terminating trunk. As shown, overflow traffic from the access DEOT '251 is passed to tandem trunk IRV3-1209 ('209) while terminating traffic from DEOT '265 is passed to tandem trunk LUB2-15 ('15). Tandem trunk '209 is connected to tandem switch AMRLTXO215T ('215T) while tandem trunk '15 is connected to tandem switch CDWRTXXA01T (01T). Access tandem trunk '209 has a usage rate of 36% while terminating tandem trunk '15 has a usage rate of 17%. Both rates are acceptable given the arbitrary 75% predetermined usage rate.

What FIG. 16 shows is that if both DEOT trunks '251 and '265 are filled to capacity their overflow traffic is routed to the tandem trunks. This is the way it should be since there is a fixed cost associated with each DEOT trunks, irrespective of the usage rate for those trunks. Conversely, the cost for using tandem trunks is based on a time and mileage basis. One thing to note with respect to access tandem trunk '209 is that it has 240 circuits. The reason that there are so many circuits connected to this tandem trunk is that there may be a number of end offices subtending to it. Therefore, it needs to be sized sufficiently large so that it can adequately service all of its subtended end offices.

FIG. 17 is an exemplar optimization summary particularly showing the cost savings if trunks are resized as recommended by the NAOMI system. The TSA is shown to be the same as that shown in FIG. 15, namely BELONYFR20T ('20T), with the POP being BUF and the type of service being standard. See designation 1702. The same TSA was optimized, as indicated at 1704. The utilization threshold, shown at 1706, used for the optimization was set at 75%. The recuperation dates, designated at 1708 as 90 days, provide a time period for recovering the non-recurring cost, which is the cost incurred by the wide area service provider for requesting that changes be effected for the trunks of the access network. 90 days is an arbitrary number that enables the wide area service provider to determine if the changes are cost effective. At this point, the optimization of the trunk configuration has been run and some recommendations made to the traffic engineer to inform him of the changes that should be made to optimize the trunk configuration at a minimum access cost.

Thus, at the bottom panel, designated as 1710, of the display of FIG. 17, it can be seen that before TSA '20T was optimized, it costs $3,406.98 a day for access charges. After optimization, the cost falls down to $2,754.27 per day. There is a non-recurring charge of $8,119.00 for the access provider to reconfigure its trunk connections as calculated by the NAOMI system. Multiplying the number of days (90) with the daily cost yields $306,629.10 for the trunk configuration without optimization; whereas with optimization, the cost for 90 days including the non-recurring charge is $256,003.30. Thus, there is a savings of approximately $50,000 for TSA '20T at the end of the recuperation period.

Note that to truly optimize the system, if one end office of a TSA is reconfigured, all trunk connections of the TSA need to be reconfigured as well, as all end offices of that TSA are affected by the optimization. In other words, after the optimization by the NAOMI system, the traffic engineer needs to follow all recommendations made, in order to ensure that an optimized trunk configuration is effected for that TSA.

FIG. 18 shows the recommendations presented to the traffic engineer on how best to size a particular tandem trunk for the TSA shown in FIG. 17. As indicated at 1802 the original utilization rate was 77%, which is higher than the predetermined 75%. There are also 72 circuits either purchased or leased for that particular trunk, as designated at 1804. The trunk is deemed to be bidirectional, as indicated at 1806. With optimization, there should be 96 circuits, as indicated at 1808. Thus, the NAOMI system, after performing the optimization process, recommends that 24 new circuits, designated at 1810, be added to the trunk. With the additional 24 circuits, the utilization rate for the optimized trunk gets down to 56%, as designated at 1812.

FIG. 19 is an exemplar display of a traffic profile or pattern which for example is represented by the traffic profile icon 1602 shown in FIG. 16. In essence, if the traffic profile icon 1602 is activated in FIG. 16, the display of FIG. 19 results. FIG. 19 shows the traffic pattern of calls traversing to an end office through terminating, originating and 800 trunks. As shown, the originating trunk carried 102 CCS of traffic between the hours 0700 and 1200, with 22 CCS of traffic occurring at 0900 hour. No traffic occurred at either the terminating or 800 trunks. This traffic profile thus enables the traffic engineer to size the originating trunk to be sufficiently large to carry the peak hour traffic load. The fact that no terminating traffic or 800 special service traffic is shown indicates that the end office of FIG. 19 is an originating end office whose trunk(s) is/are access trunk(s).

The cost data for an access provider is shown in FIG. 20. The exemplar access provider for FIG. 20 is Southwestern Bell. See 2002. FIG. 20 specifically shows the non-recurring costs for different types of trunk connections that are charged by the access provider for changing its trunk configuration. As shown, the connect cost for a DS1 trunk is $456.00, indicated at 2004, while the connect cost for a DS3 trunk is $496.00, indicated at 2006. There are however no disconnect costs for either the DS1 or DS3 trunks. See 2008 and 2010, respectively. The other charges shown are the different tariffs or rates that are allowed under LTR. As shown, the rates are broken down to charges that occur at the serving wire center, indicated at "Channel Term", of $1,696.04. This is the cost that a wide area service provider or a long distance service provider is charged for connecting to a local exchange carrier. There is also a charge under "MUX". This is a charge for multiplexing a bundle of circuits, for example 672 circuits, that come in from the long distance carrier into 24 circuit trunks to be sent through the multiplex equipment. The MUX charge of $815.00 is the monthly charge for the use of the multiplex equipment at the serving wire center, which belongs to the access provider. The part of the display under "Banded Mileage" shows the mileage separating the SWC and the end office, or more specifically the equipment at the end offices. Equipment charges at the end office are levied against the wide area service providers, in addition to the charge per mile/per minute for the different trunks of the trunk configuration of the TSA. Essentially what "Banded Mileage" shows is that the access provider can charge a wide area service provider based on different bands of mileage for the rental of the circuits for DEOTs and tandem trunks.

Inasmuch as the present invention is subject to many variations, modifications and changes in detail, it is intended that all matter described throughout this specification and shown in the accompanying drawings be interpreted as illustrative only and not in a limiting sense. Accordingly, it is intended that the invention be limited only by the spirit and scope of the hereto appended claims.

We claim:

1. In a telecommunications network including a wide area service provider having a plurality of points-of-presence (POPs) and a plurality of local area access providers each having a plurality of end offices and tandem switches, a method of effecting an optimized configuration of direct and tandem trunk connections between at least one point-of-presence (POP) of said wide area service provider and at least one end office of a local area access provider for a particular grade of service at minimal access cost, comprising the steps of:

(a) determining the respective locations of the POPs, tandem switches and end offices within said network;

(b) determining access capabilities of said one end office of said local area access provider to which access is sought by said one POP of said wide area service provider;

(c) obtaining cost information relating to direct and tandem trunk utilization between said one POP and said one end office;

(d) identifying telecommunications traffic pattern of said one end office;

(e) defining a tandem service area to include at least said one POP, said one end office and at least one tandem switch; and (f) utilizing data at least relating to the relative distance between said one POP and said one end office, said access capabilities of said one end office, said cost information and said traffic pattern to determine how best to configure direct and tandem trunks to connect said one POP with said one end office for effecting within said tandem service area an optimized trunk configuration at a minimum access cost.

2. The method of claim 1, wherein said step (e) of defining a tandem service area further comprises the steps of:

identifying the tandem switch connected to said one end office for routing overflow traffic traversing between said one end office and said one POP;

configuring any other end offices also connected to said tandem switch as part of said tandem service area;

identifying any other tandem switch connected to each of said any other configured end offices;

configuring said any other identified tandem switch as part of said tandem service area; and repeating the above steps for each identified tandem switch in said tandem service area.

3. The method of claim 1, wherein said step (b) further comprises the step of:

determining the traffic capabilities and connection capabilities of said one end office and the circuit capacity of each trunk connection to said one end office.

4. The method of claim 3, further comprising the step of:

defining the traffic capabilities of said one end office to be access, terminating and/or bidirectional, and the connection capabilities to include either or both tandem trunk and direct end office trunk (DEOT) connections.

5. The method of claim 1, wherein said step (c) further comprises the step of:

determining any fixed costs charged by the access provider of said one end office and the respective costs of connecting a direct trunk and a tandem trunk to said end office.

6. The method of claim 1, wherein said step (d) further comprises the step of:

collecting the rate of telecommunications usage for said end office over a given period of time.

7. The method of claim 1, further comprising the step of:

retrieving from database means data relating to any or all respective locations of the POPs, tandem switches and end offices, the access capabilities of the end offices, the cost information relating to direct and tandem trunks, and the traffic patterns of the end offices in said tandem service area.

8. The method of claim 1, further comprising the step of:

presenting said optimized trunk configuration resulting from said step (f) to operating personnel.

9. The method of claim 8, further comprising the step of:

generating work orders from which changes can be implemented to said tandem service area to bring its trunk configuration into conformance with said optimized trunk configuration.

10. The method of claim 1, further comprising the step of:

establishing alarm operating conditions for said defined tandem service area; and identifying said tandem service area for optimization when it operates with alarm conditions.

11. The method of claim 10, wherein said tandem service area is optimized at the discretion of operating personnel.

12. The method of claim 10, wherein one of said alarm operating conditions established for said tandem service areas comprises a communications usage rate for at least one trunk in said tandem service area; and wherein an alarm condition is met whenever the usage rate is greater than a predetermined percentage of the usage capacity of said one trunk.

13. The method of claim 10, wherein one of said alarm conditions established for said tandem service area comprises a communications usage rate for at least one direct trunk thereof; and wherein the alarm condition is met whenever the usage rate is less than said communications usage rate of said direct trunk.

14. The method of claim 1, wherein the trunks of said trunk connections between said one POP and said one end office may carry one-way and bi-directional communications; said method further comprising the step of:

establishing alarm conditions for said tandem service area, said alarm conditions being selected from the group consisting of (i) bi-directional trunks operating with one-way communications, (ii) multiple one-way trunks operating to achieve bi-directional communications, (iii) one-way trunks operating with bi-directional communications, and (iv) multiple same direction tandem trunks.

15. A method of optimally configuring direct and tandem trunk connections between a wide area network and end offices of access providers through points-of-presence (POPs) of said wide area network, comprising the steps of:

(a) obtaining data defining access capabilities of the end offices from which access is to be gained from said POPs;

(b) obtaining cost data pertaining to direct and tandem trunk capabilities of the to be accessed end offices and their respective access providers;

(c) obtaining data characteristic of telecommunications traffic patterns from said to be accessed end offices;

(d) defining tandem service areas to be configured with direct and tandem trunk connections of said to be accessed end offices and said POPs such that each defined tandem service area includes at least one end office, at least one POP and at least one tandem switch;

(e) identifying tandem service areas which are candidates for optimization; and (f) for each tandem service area identified, effecting an optimized trunk configuration for a particular grade of service at a minimum access cost therefor by calculating a minimum number of direct and tandem trunk connections for said each identified tandem service area based on at least the data obtained in said steps (a), (b) and (c) for said each identified tandem service area.

16. The method of claim 15, further comprising the steps of:

identifying the candidates for optimization in step (e) as all tandem service areas; and optimizing said candidates defined in said step (d) in accordance with said step (f) periodically.

17. The method of claim 15, further comprising the steps of:

establishing alarm operating conditions for each defined tandem service area; and identifying the candidates for optimization in said step (e) as those tandem service areas operating under alarm conditions.

18. The method of claim 15, wherein the candidates for optimization are selected at the discretion of operating personnel.

19. The method of claim 15, wherein to define each tandem service area in said step (d), said method further comprises the steps of:

identifying a first tandem trunk connected to a first tandem switch through which overflow traffic traversing between the one end office and the one POP of said each tandem service area is routed;

configuring any other end offices also connected to said first tandem switch as part of said each tandem service area;

identifying any other tandem trunk connected to each of said any other configured end offices;

configuring any tandem switch connected to said any other identified tandem trunk as part of said each tandem service area; and repeating the above steps for each tandem trunk in said each tandem service area.

20. The method of claim 15, wherein said access capabilities defining step (a) comprises the step of:

determining the traffic and connection capabilities of each of said end offices.

21. The method of claim 20, further comprising the steps of:

defining said each end office that is adaptable to carry one way or bidirectional communications; and defining said each end office that is adaptable to both tandem trunk and direct end office trunk (DEOT) connections.

22. The method of claim 15, wherein said step (b) further comprises the step of:

determining the entrance facility cost charged by the access provider of each accessed end office, and the cost of connecting direct and tandem trunks to said each accessed end office.

23. The method of claim 15, wherein said step (c) further comprises the step of:

collecting the rate of telecommunications usage for each of said accessed end offices over a given period of time.

24. The method of claim 15, further comprising the step of:

retrieving from database means data relating to any or all of the POPs, tandem switches and end offices, the access capabilities of the end offices, the cost data pertaining to direct and tandem trunks, and the traffic patterns of the to be accessed end offices.

25. The method of claim 15, further comprising the step of:

presenting said optimized trunk configuration resulting from said step (f) for each identified tandem service area to operating personnel.

26. The method of claim 25, further comprising the step of:

generating work orders from which changes can be implemented to each of said identified tandem service areas to bring its trunk configuration into conformance with said optimized trunk configuration.

27. In a telecommunications network including a wide area service provider having a plurality of points-of-presence (POPs) and a plurality of local area access providers each having a plurality of end offices and tandem switches, a system for effecting an optimized configuration of direct and tandem trunk connections between at least one point-of-presence (POP) of said wide area service provider and at least one end office of a local area access provider for a particular grade of service at minimal access cost, comprising:

database means for storing the respective locations of the POPs, tandem switches and end offices within said network, and cost information relating to direct and tandem trunk utilization between at least said one POP and said one end office;

means for determining access capabilities of said one end office of said local area access provider to which access is sought by said one POP of said wide area service provider;

means for collecting telecommunications traffic pattern of said one end office; and processor means for defining a tandem service area to include at least said one POP, said one end office and at least one tandem switch, said processor means further utilizing data at least relating to the relative distance between said one POP and said one end office, said access capabilities of said one end office, said cost information and said traffic pattern to determine how best to configure direct and tandem trunks to connect said one POP with said one end office for effecting within said tandem service area an optimized trunk configuration at a minimum access cost.

28. System of claim 27, wherein said processor means defines said tandem service area by identifying the tandem switch connected to said one end office for routing overflow traffic traversing between said one end office and said one POP;

configuring any other end offices also connected to said tandem switch as part of said tandem service area;

identifying any other tandem switch connected to each of said any other configured end offices;

configuring said any other identified tandem switch as part of said tandem service area; and repeating the above steps for each tandem switch in said tandem service area.

29. System of claim 27, wherein said determining means further determines the traffic capabilities and connection capabilities of said one end office and the circuit capacity of each trunk connection to said one end office.

30. System of claim 29, further comprising:

means for defining the traffic capabilities of said one end office to be access, terminating and/or bidirectional, and the connection capabilities to include either or both tandem trunk and direct end office trunk (DEOT) connections.

31. System of claim 27, wherein said determining means further comprises:

means for retrieving any fixed cost charged by the access provider of said one end office and the respective costs of connecting a direct trunk and a tandem trunk to said end office.

32. System of claim 27, wherein said collecting means collects the rate of telecommunications usage for said end office over a given period of time.

33. System of claim 27, further comprising:

means for retrieving from said database means data relating to any or all respective locations of the POPs, tandem switches and end offices, the access capabilities of the end offices, the cost information relating to direct and tandem trunks, and the traffic patterns of the end offices in said tandem service area.

34. System of claim 27, further comprising:

terminal means for presenting said optimized trunk configuration effected by said processor means to operating personnel, said terminal means allowing the operating personnel to optimize said tandem service area.

35. System of claim 34, wherein said terminal means further generates work orders from which changes can be implemented to said tandem service area to bring its trunk configuration into conformance with said optimized trunk configuration.

36. System of claim 27, further comprising:

means for establishing alarm operating conditions for said defined tandem service area; and means for identifying said tandem service area for optimization when it operates with alarm conditions.

37. System of claim 36, wherein said establishing means establishes one of said alarm operating conditions for said tandem service areas to include a communications usage rate for at least one trunk in said tandem service area, an alarm condition being met whenever the usage rate is greater than a predetermined percentage of the usage capacity of said one trunk.

38. System of claim 36, wherein said establishing means establishes one of said alarm conditions for said tandem service area to include a communications usage rate for at least one direct trunk thereof, an alarm condition being met whenever the usage rate is less than said communications usage rate of said one direct trunk.

39. System of claim 27, wherein the trunks of said trunk connections between said one POP and said one end office may carry one-way and bi-directional communications; said system further comprising:

means for establishing alarm conditions for said tandem service area, said alarm conditions being selected from the group consisting of (i) bi-directional trunks operating with one-way communications, (ii) multiple one-way trunks operating to achieve bi-directional communications, (iii) one-way trunks operating with bi-directional communications, and (iv) multiple same direction tandem trunks.

40. A system for optimally configuring direct and tandem trunk connections between a wide area network and end offices of access providers through points-of-presence (POPs) of said wide area network, comprising:

means for obtaining data defining access capabilities of the end offices from which access is to be gained from said POPs, cost data pertaining to direct and tandem trunk capabilities of the access providers of said to be accessed end offices, and data characteristic of telecommunications traffic patterns from said to be accessed end offices; and processor means for defining tandem service areas to be configured with direct and tandem trunk connections of said to be accessed end offices and POPs such that each defined tandem service area includes at least one end office, at least one tandem switch and at least one POP, and for identifying tandem service areas which are candidates for optimization, said processor means effecting an optimized trunk configuration for a particular grade of service at a minimum access cost therefor for each identified tandem service area by calculating a minimum number of direct and tandem trunk connections for said identified tandem service area based on at least the access capabilities data, the cost data and the traffic patterns data obtained for said identified tandem service area.

41. System of claim 40, wherein said processor means further identifies all tandem service areas as candidates for optimization, said processor means further effecting an optimized trunk configuration for said all tandem service areas periodically.

42. System of claim 40, further comprising:

means for establishing alarm operating conditions for each defined tandem service area; and wherein said processor means identifies the candidates for optimization as those tandem service areas operating under alarm conditions.

43. System of claim 40, further comprising:

terminal means from which operating personnel can selected at their discretion the candidates for optimization.

44. System of claim 40, wherein said processor means identifies each tandem service area by identifying a first tandem trunk connected to a first tandem switch through which overflow traffic traversing between the one end office and the one POP of said each tandem service area is routed;

configuring any other end offices also connected to said first tandem switch as part of said each tandem service area;

identifying any other tandem trunk connected to each of said any other configured end offices;

configuring any tandem switch connected to said any other identified tandem trunk as part of said each tandem service area; and repeating the above steps for each tandem trunk in said each tandem service area.

45. System of claim 40, wherein said obtaining means determines the traffic and connection capabilities of each of said end offices.

46. System of claim 45, further comprising:

means for defining said each end office to be adaptable to carry one way or bidirectional communications, and both tandem trunk and direct end office trunk (DEOT) connections.

47. System of claim 40, wherein said obtaining means further comprises:

means for determining the entrance facility cost charged by the access provider of each accessed end office, and the cost of connecting direct and tandem trunks to said each accessed end office.

48. System of claim 40, wherein said obtaining means further comprises:

means for collecting the rate of telecommunications usage for each of said accessed end offices over a given period of time.

49. System of claim 40, further comprising:

means for retrieving from database means data relating to any or all of the POPs, tandem switches and end offices, the access capabilities of the end offices, the cost data pertaining to direct and tandem trunks, and the traffic patterns of the to be accessed end offices.

50. System of claim 40, further comprising:

terminal means for presenting said optimized trunk configuration effected by said processor means for each identified tandem service area to operating personnel.

51. System of claim 50, wherein said terminal means further comprises:

means for generating work orders from which changes can be implemented to each of said identified tandem service areas to bring its trunk configuration into conformance with said optimized trunk configuration.

* * * * *